United States Patent [19]
Sato et al.

[11] Patent Number: 5,619,866
[45] Date of Patent: Apr. 15, 1997

[54] ADSORPTIVE TYPE REFRIGERATION APPARATUS

[75] Inventors: Hideaki Sato, Anjo; Shin Honda, Nagoya; Seiji Inoue, Anjo; Hiroshi Tanaka; Tadayoshi Terao, both of Toyoake, all of Japan

[73] Assignee: Nippondenso Co., Ltd., Kariya, Japan

[21] Appl. No.: 530,518

[22] Filed: Sep. 19, 1995

[30] Foreign Application Priority Data

| Sep. 19, 1994 | [JP] | Japan | 6-223461 |
| Jan. 6, 1995 | [JP] | Japan | 7-000661 |
| Feb. 8, 1995 | [JP] | Japan | 7-020596 |

[51] Int. Cl.$^6$ ............... F25B 17/08; F25B 7/00
[52] U.S. Cl. ............... 62/480; 62/335; 62/106
[58] Field of Search .............. 62/480, 476, 106, 62/335

[56] References Cited

U.S. PATENT DOCUMENTS

| 5,027,607 | 7/1991 | Rockenfeller et al. | 62/106 |
| 5,291,753 | 3/1994 | Rockenfeller et al. | |
| 5,347,815 | 9/1994 | Jones | 62/480 |
| 5,419,156 | 5/1995 | Sywulka | 62/480 |

FOREIGN PATENT DOCUMENTS

| 622593 | 11/1994 | European Pat. Off. . |
| 2-203169 | 8/1990 | Japan . |
| 3-152363 | 6/1991 | Japan . |
| 3-199864 | 8/1991 | Japan . |
| 5-133638 | 5/1993 | Japan . |
| 5-248727 | 9/1993 | Japan . |
| 5-322364 | 12/1993 | Japan . |
| 93/16339 | 8/1993 | WIPO . |
| 94/27098 | 11/1994 | WIPO . |

*Primary Examiner*—William Doerrler
*Attorney, Agent, or Firm*—Cushman, Darby & Cushman IP Group of Pillsbury Madison & Sutro LLP

[57] ABSTRACT

An (n)th adsorber and (n+1)th adsorber among a plurality of adsorbers in an adsorption process are connected thermally in series, and adsorbent of the (n)th adsorber which is a previous stage is cooled by adsorption of refrigerant by adsorbent of the (n+1)th adsorber which is a subsequent stage. That is to say, adsorbent of a first-stage adsorber on the left-hand side which adsorbs vapor of refrigerant such as water which exits from an evaporator is strongly cooled by adsorption of vapor from refrigerant such as water which flows through a cooling pipe by adsorbent of a second-stage adsorber on the right-hand side, large adsorption capacity is imparted by a reduction in temperature, and as a result, the evaporator demonstrates large refrigeration capacity. Consequently, a compact adsorptive type refrigeration apparatus which demonstrates large refrigeration capacity while having a compact adsorber and using a comparatively small quantity of adsorbent is provided. The present invention can also be applied with respect to an adsorption process of a refrigeration system in which adsorbent circulates in an adsorber.

18 Claims, 28 Drawing Sheets

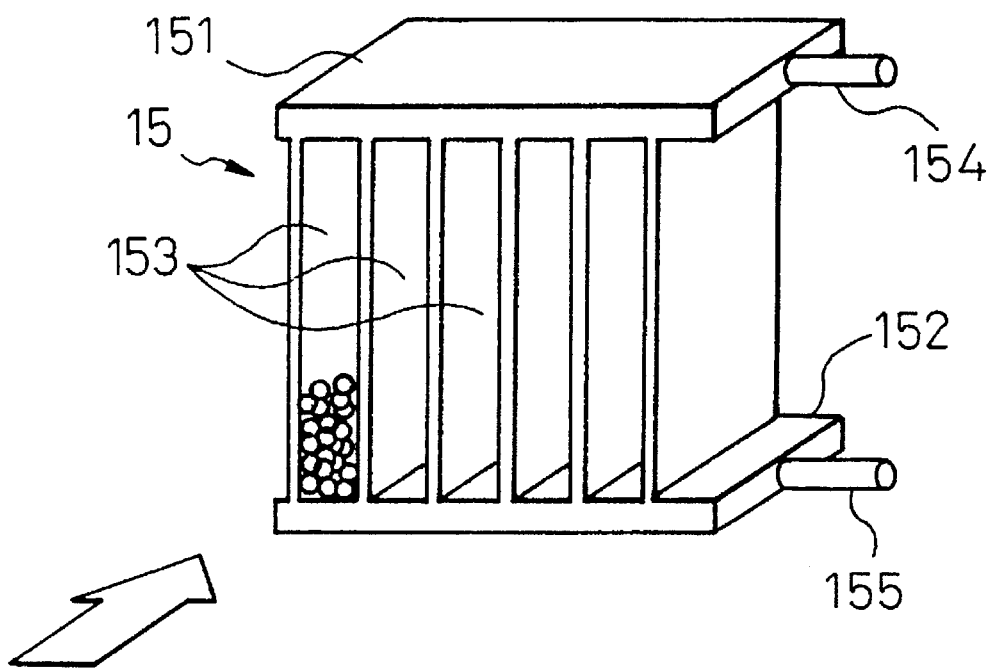
FIG. 27A
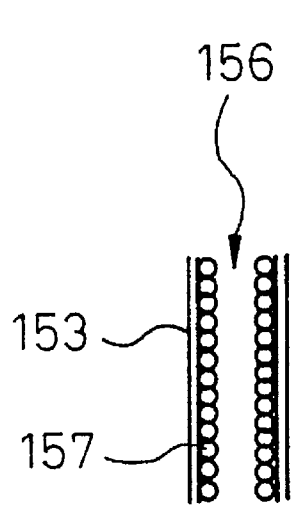 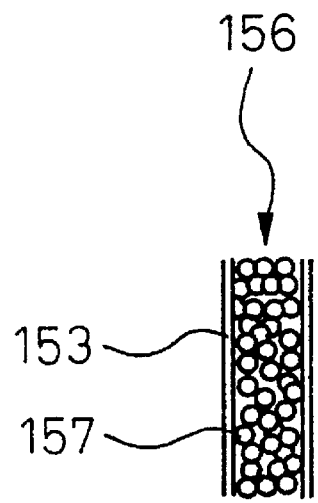
FIG. 27B   FIG. 27C

ADSORPTIVE TYPE REFRIGERATION APPARATUS

CROSS REFERENCE TO RELATED APPLICATION

This application is based upon and claims priority from Japanese Patent Application No. 6-223461 filed Sep. 19, 1994, Japanese Patent Application No. 7-661 filed Jan. 6, 1995 and Japanese Patent Application No. 7-20596 filed Feb. 8, 1995, with the contents of each document being incorporated herein by reference.

BACKGROUND OF THE INVENTION

1. Field of the Invention

The present invention relates to an adsorptive type refrigeration apparatus utilizing adsorbent such as silica gel or zeolite to be employed as a portion of for example an air-conditioning apparatus.

2. Description of the Related Art

As shown in FIG. 2, an adsorptive type refrigeration apparatus according to the prior art is structured from a pair (two) of adsorbers 1 and 2 internally filled with an adsorbent such as silica gel or zeolite and disposed in parallel, an evaporator 3 which cools air within a room by a refrigerant such as circulating water and discharges cooled air, a condenser 4 which cools and causes liquefaction of refrigerant by external air, a four-way valve 6 or three-way valves 6' and 6" to switch passages and disposed intermediately in piping which connects between these adsorbers or connects these to an external device, and furthermore a device such as a pump 7 which causes refrigerant to circulate. The adsorber 1 is provided with a cooling pipe 1' and heating pipe 1", and the adsorber 2 is similarly provided with a cooling pipe 2' and heating pipe 2".

FIG. 2 indicates a case (operation state) where the adsorption device 1 on the left-hand side is in a state of an adsorption process wherein adsorbent in an interior of the adsorber 1 has adsorbed refrigerant vapor (steam) and, along with this, the adsorber 2 of the right-hand side is an a state of a desorption (release) process wherein adsorbent in an interior of the adsorber 2 has desorbed and discharged refrigerant vapor (steam). The several valves 6, 6', and 6" are switched and operated by a controller not illustrated so that the adsorber 1 and adsorber 2 alternatingly repeat the adsorption process and desorption process and, together with this, each assumes the process which is the opposite of the other.

Hot water of for example 100° C. is supplied as a heating fluid, and water of for example 40° C. is supplied as a cooling fluid. In the state indicated in FIG. 2, adsorbent within the adsorber 1 has discharged water vapor in the previous desorption process and so its amount of water content has been reduced and its amount adsorbed (this is indicated by percentage i.e., this means moisture-adsorption ratio) has dropped, and its capacity to adsorb water vapor has recovered (regenerated). Because of this, heat is generated and temperature of the adsorber 1 interior rises when air is cooled in the evaporator 3. Since the capacity of the adsorbent to adsorb water vapor declines, water of for example 40° C. cools the adsorbent by flowing as cooling fluid in the cooling pipe 1' of the adsorber 1. Consequently, the adsorbent adsorbs water until the adsorbent approaches a saturated state at the temperature of 40° C.

In the state shown in FIG. 2, the adsorber 2 simultaneously executes the desorption process. By causing hot water of for example 100° C. to flow as heating fluid in the heating pipe 2" in the desorption process, adsorbent within the adsorber 2 is heated and water absorbed in the previous adsorption process is desorbed (released). Water vapor generated at the time thereof is sent to the condenser 4 and is condensed. Through this, the amount of water content of the adsorbent within the adsorber 2 is reduced, the amount adsorbed drops, and the capacity to adsorb water vapor again recovers (regenerates). Passages are switched by the several valves 6, 6', and 6", and when oppositely to FIG. 2 the adsorber 1 on the left-hand side is placed in a state of the desorption process and, along with this, the adsorber 2 of the right-hand side is placed in a state of the adsorption process, it is possible to cool air to for example approximately 5° C. in the evaporator 3 and cause cooled air to be generated essentially continuously.

In a case where water of 40° C. is used as cooling fluid and hot water of 100° C. is used as heating fluid in an attempt to obtain heat at approximately 5° C. in an adsorptive type refrigeration apparatus by for example silica gel and water in this way, as shown in FIG. 4, the residual amount adsorbed of adsorbent within the adsorber at the time of termination of the desorption process is approximately 4% wt (point A of FIG. 4), and the amount adsorbed of adsorbent within the adsorber at the time of termination of the adsorption process is approximately 7% wt (point B of FIG. 4). Consequently, according to this example, adsorption and desorption comes to be between the amount adsorbed of 4% and 7% and because this difference is merely 3% wt, which is small, it is necessary to fill the adsorbers with a large quantity of adsorbent in order to obtain sufficient refrigeration capacity (cooling capacity).

In this regard, according to the prior art stated in Japanese Patent Application Laid-open No. 5-248727, a method involving boosting the extent of desorption by causing moisture desorbed from adsorbent of one adsorber to be absorbed by the adsorbent of another adsorber is proposed to sufficiently lower an amount adsorbed (quantity) of adsorbent in a desorption process. That is to say, this prior art adopts a structure which makes multiple stages in the adsorber in the desorption process of the adsorber.

According to this method, however, although the amount adsorbed of 4% wt at the time of termination of the desorption process can be further reduced, it cannot be caused to be 0% wt, and even if hypothetically the amount adsorbed could be set to be 0% wt, an effect of reduction is small, and in a case where the adsorbent is silica gel, it cannot be said that an adsorption capacity which is 37% wt at maximum is sufficiently used to advantage. Even in a case where the cooling of 30° C. stated in Japanese Patent Application Laid-open No. 5-248727 is performed, only a amount adsorbed-adsorption ratio of approximately 15% is obtained, and this figure is not even half of the maximum amount adsorbed. When cooling temperature is 40° C., which is even higher, substantially only adsorption of approximately 9% is performed. As a result of this, the amount of adsorbent used becomes large even in this case of the prior art, the volume of an adsorber to contain this becomes large, and sufficient compactness of the adsorptive type refrigeration apparatus becomes difficult.

SUMMARY OF THE INVENTION

In light of the above-described problems in the prior art, it is an object of the present invention to provide an adsorptive type refrigeration apparatus which solves these problems by a new method, having a sufficiently large amount adsorbed (quantity) and cooling capacity while having an adsorber which is compact and contains a comparatively small amount of adsorbent, and can achieve overall system compactness thereby.

The present invention differs from the prior art which raises an extent of desorption by setting two series adsorber in desorption process, and proposes a new method utilizing a general characteristic of adsorbent that amount adsorbed rises when adsorbent is cooled to a lower temperature. By cooling an adsorbent of first adsorber in an adsorption process with an operation of second adsorber connected at a subsequent stage of the first adsorber, the temperature of the adsorbent in the first adsorber is lowered further. Consequently, amount adsorbed rises dramatically. The above-described problems are solved by setting a plurality of adsorbers in multiple stages in an adsorption process.

Concretely, in the present invention one preferred mode for solving the above-described problems is proposed.

An adsorptive type refrigeration apparatus includes a plurality of adsorbers, evaporators, condensers, and passage-switching units. Each adsorber includes adsorbent to adsorb refrigerant and has a heating unit and cooling unit for heating and cooling adsorbent.

In an adsorption process, at least an (n)th adsorber and an (n+1)th adsorber among the plurality of adsorbers are thermally connected in series, so that adsorbent contained within the nth adsorber which is a previous stage is cooled by adsorption of refrigerant by adsorbent contained within the (n +1)th adsorber which is a subsequent stage.

As a result, the temperature of adsorbent contained in the nth adsorber is sufficiently lowered, and adsorption capacity of refrigerant after passing through the evaporator becomes considerably large. Consequently, even with a compact adsorber, it becomes possible to adsorb a large quantity of refrigerant after passing through the evaporator until it is saturated, and large cooling capacity can be obtained in the evaporator.

BRIEF DESCRIPTION OF THE DRAWINGS

FIGS. 27A to 27C indicate a structure of a heat exchanger lacking novelty in itself to describe a twenty-first embodiment; FIG. 27A is a perspective view of the heat exchanger, and FIGS. 27B and 27C are sectional views indicating respectively differing specifications of loading of adsorbent.

DETAILED DESCRIPTION OF THE PREFERRED EMBODIMENTS

Figure 1:
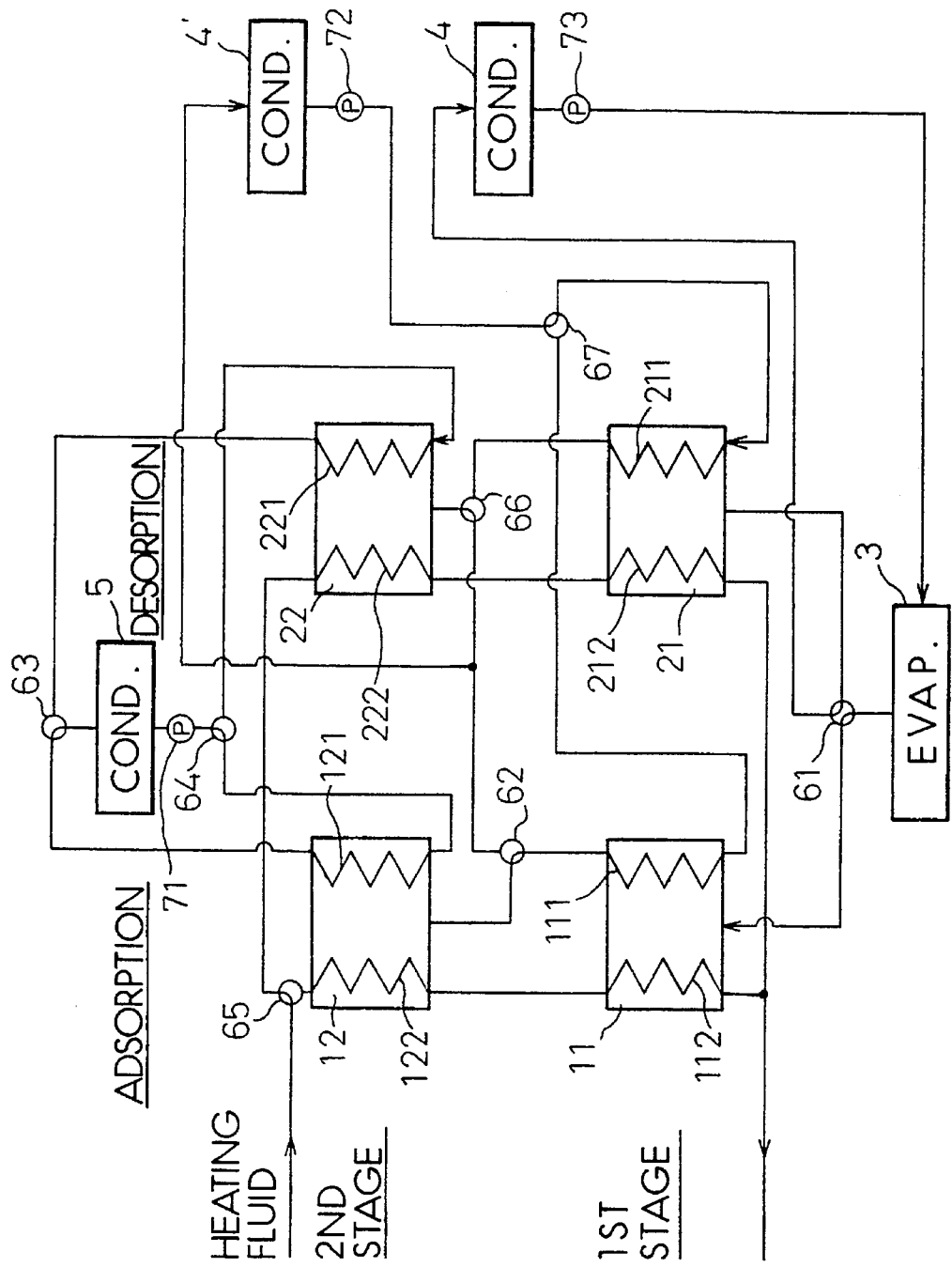
FIG. 1 is a system structural diagram indicating an adsorptive type refrigeration apparatus as a first embodiment of the present invention.
Figure 2:
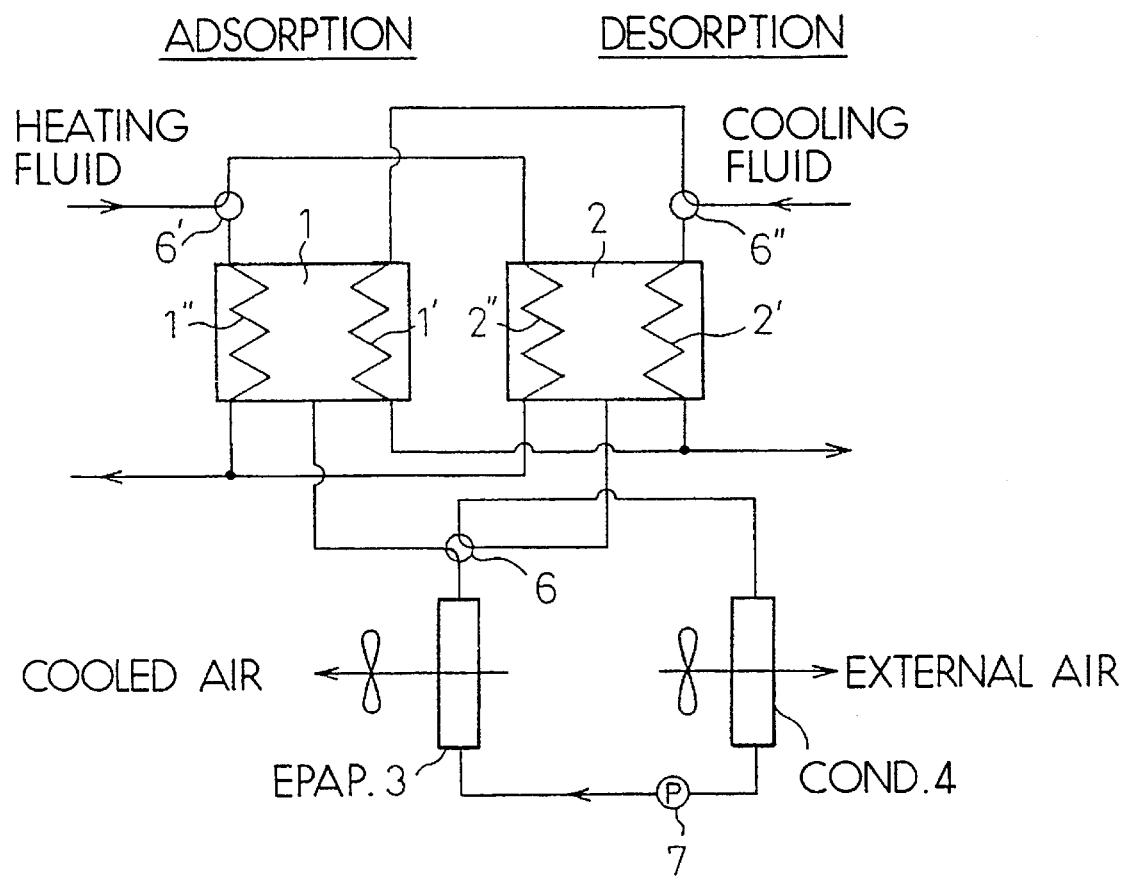
FIG. 2 is a system structural diagram exemplifying an adsorptive type refrigeration apparatus according to the prior art.

A system structure of a first embodiment which is a fundamental embodiment according to the present invention is indicated in FIG. 1. A system of the first embodiment is structured from four adsorbers 11, 12, 21, and 22, an evaporator 3, condensers 4, 4', and 5, and piping connecting them, as well as a four-way valve 61, three-way valves 62 to 67, and pumps 71 to 73 disposed intermediately in the piping. The respective adsorbers are each filled internally with adsorbent. Pipes 112, 122, 212, and 222 to flow heating fluid and pipes 111, 121, 211, and 221 to flow cooling fluid are provided as heating and cooling devices for heating and cooling the adsorbent. Additionally, adsorbers 11 and 21 are disposed at first-stage, and adsorbers 12 and 22 are disposed at second-stage.

Connections of the several portions and flow of internal fluid for these will be described in FIG. 1, the adsorbers 11 and 12 on the left-hand side are in a state of adsorption, and the adsorbers 21 and 22 on the right-hand side are in a state of desorption. Because the evaporator 3 and the adsorber 11 are connected by the four-way valve 61, vapor of the interior of the evaporator 3 flows into the adsorber 11 and is adsorbed by the adsorbent not illustrated. Water which was enclosed at the time of the previous desorption is in the interior of the cooling pipe 111 within the adsorber 11. Because the pipe 111 and the second-stage adsorber 12 are connected by the three-way valve 62, when water evaporated within the evaporator 3 is adsorbed into the adsorber 11, water within the pipe 111 is evaporated by heat generated at the time thereof, and is adsorbed by adsorbent within the adsorber 12. In this case, the cooling pipe 121 of the adsorber 12 and the condenser 5 are communicated by the three-way valve 63, and refrigerant within the pipe 121 usurps heat from the adsorber 12 and is evaporated, is heated and condensed by the condenser 5, passes through the pump 71 and three-way valve 64, and returns to the cooling pipe 121 of the adsorber 12. (It is also acceptable for single-phase refrigerant which is not evaporated or condensed to circulate and cool the adsorber 12.)

Meanwhile, on the desorption side, heating fluid flows to the respective heating pipes 212 and 222 for both adsorbers 21 and 22 due to the three-way valve 65. The adsorber 22 is communicated with the cooling pipe 211 of the adsorber 21 via the three-way valve 66, condenser 4', pump 72, and three-way valve 67. Additionally, because the interior of the adsorber 21 is communicated with the condenser 4 via the four-way valve 61 at this time, water condensed by the condenser 4 is returned to the evaporator 3 by the pump 73.

Although there may also be some portions which have already been made clear from the foregoing description, operation of the system of FIG. 1 will be described in summary hereinafter. Similarly to the description of structure, the left hand-side of FIG. 1 is taken to be a state of the adsorption process, and the right-hand side is taken to be a state of the desorption process.

During adsorption, adsorbent within the adsorber 11 adsorbs water vapor, and so pressure within the evaporator 3 and adsorber 11 drops, and temperature within the evaporator 3 also drops simultaneously with this. Because of this, evaporation of water occurs within the evaporator 3. At this time, room air passing through the evaporator 3 is cooled, and a cooling effect is obtained. Meanwhile, when adsorbent within the adsorber 11 adsorbs water vapor, it discharges heat of adsorption. This heat is absorbed and water within the cooling pipe 111 is evaporated, the water vapor thereof is adsorbed by adsorbent within the second-stage adsorber 12, and adsorbent within the adsorber 12 discharges heat of adsorption at this time. This heat is imparted to refrigerant flowing within the cooling pipe 121, and further is discharged to outside air by the condenser 5. In this way, temperature rises stepwise due to an amount of absorbed heat in the evaporator 3 so that temperature within the adsorber 12 rises higher than temperature within the adsorber 11 stepwise. Accordingly, ultimately heat of the adsorber 12 is absorbed by the cooling fluid flowing within the cooling pipe 121, and is discharged into outside air by the condenser 5 which is a heat radiator.

Figure 3:
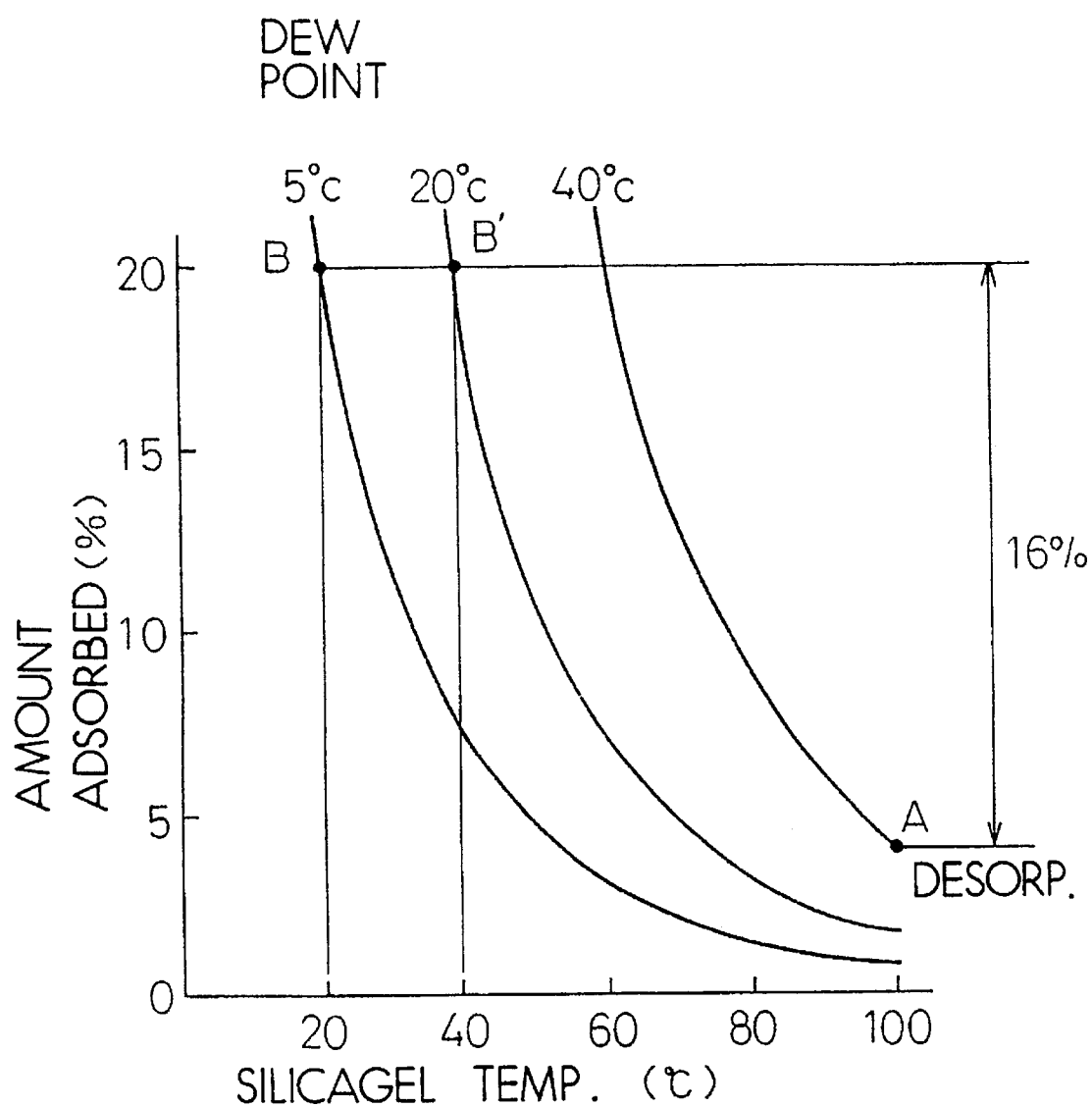
FIG. 3 is a characteristic diagram to describe a mode of operation and effects of the first embodiment.
Figure 4:
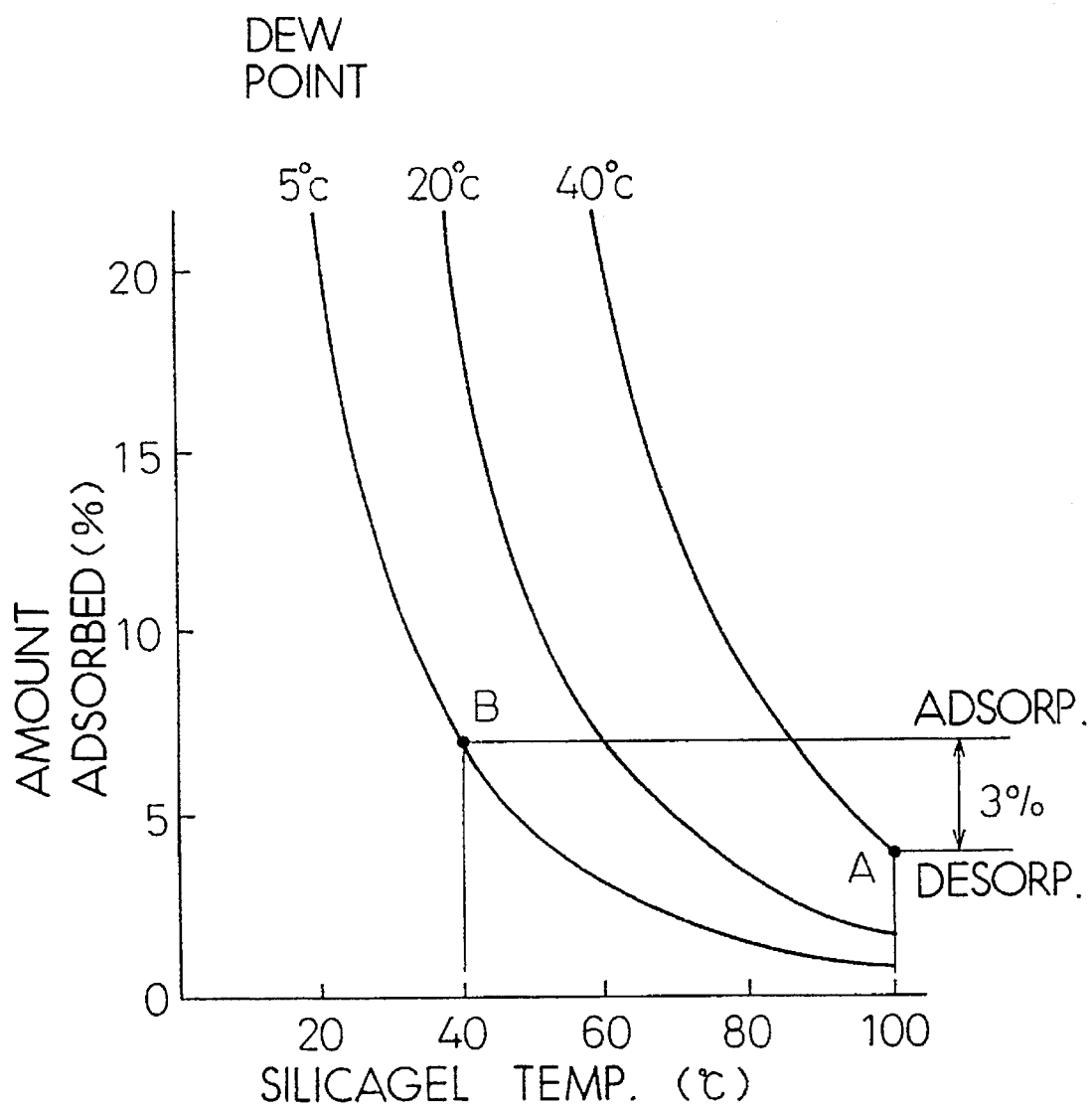
FIG. 4 is a characteristic diagram to describe problem points of an adsorptive type refrigeration apparatus according to the prior art.

A first example of an adsorption state occurring in the respective adsorbers 11 and 12 at this time is indicated in FIG. 3. An amount adsorbed (this is indicated by percentage.) The amount adsorbed means moisture-adsorption ratio. The amount adsorbed of adsorbent within both the adsorbers 11 and 12 initially becomes 4% due to the previous desorption process (point A in the drawing). The maximum adsorption ratio of the respective adsorbers is determined according to dew-point temperature of water vapor to be introduced and temperature of adsorbent (silica gel), i.e., cooling temperature within the adsorbers. Saturated water vapor for which the dew-point temperature is approximately 5° C. is sent to the first-stage adsorber 11 from the evaporator 3, and the cooling temperature within the adsorber 11 becomes 20° C. due to the adsorption effect of water vapor of the second-stage adsorber 12 (point B in the drawing). The dew-point temperature within the second-stage adsorber 12 becomes substantially identical to the cooling temperature of the first-stage adsorber 11 and is 20° C., and the cooling temperature of the adsorber 12 is substantially identical to outside air and becomes 40° C. (point B' in the drawing). At the time of such a state, the adsorption ratio of the adsorber 11 is approximately 20% (point B), and the adsorption ratio of the adsorber 11 also becomes approximately 20% (point B'). Consequently, the difference with the 4% adsorption ratio during desorption becomes 16% for both adsorbers, and in a case of this embodiment, capacity comes to be approximately five times greater than the 3% in the case of single-stage adsorption according to the prior art.

With regard to desorption, by causing heating fluid to pass through the heating pipes 212 and 222 of the adsorbers 21 and 22, moisture is desorbed from the respective adsorbents. The adsorbents within the adsorber 21 and 22 are in the states of points B and B' after adsorption, and the moisture-adsorption amounts are respectively 20%. By being heated from here to 100° C., moisture is discharged until the state of the dew point (40° C.) of the condenser interior (point A in the drawing) is reached.

According to the first embodiment, water desorbed from adsorbent within the adsorber 22 is returned to the condenser 4', and water from the condenser 4' is returned to the cooling pipe 211. Additionally, water desorbed from adsorbent within the adsorber 21 is returned to the condenser 4, and water from the condenser 4 is returned to the evaporator 3.

When adsorption of the adsorbers 11 and 12 and desorption of the adsorbers 21 and 22 end, the three-way valves 62 to 67 and the four-way valve 61 are switched, and oppositely to what has preceded, the adsorbers 21 and 22 enter an adsorption process and the adsorbers 11 and 12 enter a desorption process, and cooling by the evaporator 3 is performed continuously.

According to the present embodiment, water of the condenser 5 passes through only the cooling pipe 121 or 221. Additionally, water of the condenser 4' passes only through the cooling pipe 111 or 211 and within the adsorber 12 or 22. Furthermore, water from the condenser 4 passes only through the evaporator 3 and within the adsorber 11 or 21. It is another characteristic of the present embodiment that water is completely separated into three systems in this way, with no mutual intermixing.

Additionally, the pumps 72 and 73 to cause water condensed in the condenser 4 or 4' to be returned to the cooling pipe 111 or 211 or to the evaporator 3 are not necessarily required, because an upstream side is generally placed in a state wherein pressure is higher than for a downstream side, and it is also possible to substitute a fixed aperture or the like. This is similar as well for embodiments which will be described hereinafter.

The first embodiment is structured so as to have adsorbers 11 and 21 as well as 12 and 22, and by imparting the amount of absorbed heat of the evaporator 3 to adsorbent of the adsorbers in the two stages, these heats are discharged from a heat radiator to outside air after temperature has been risen to differing temperatures in two stages, and temperature of adsorbent within adsorbers of the previous-stage side is further lowered, but it is also acceptable to use the same way of thinking to increase the number of stages, such as to three or four stages.

Figure 5:
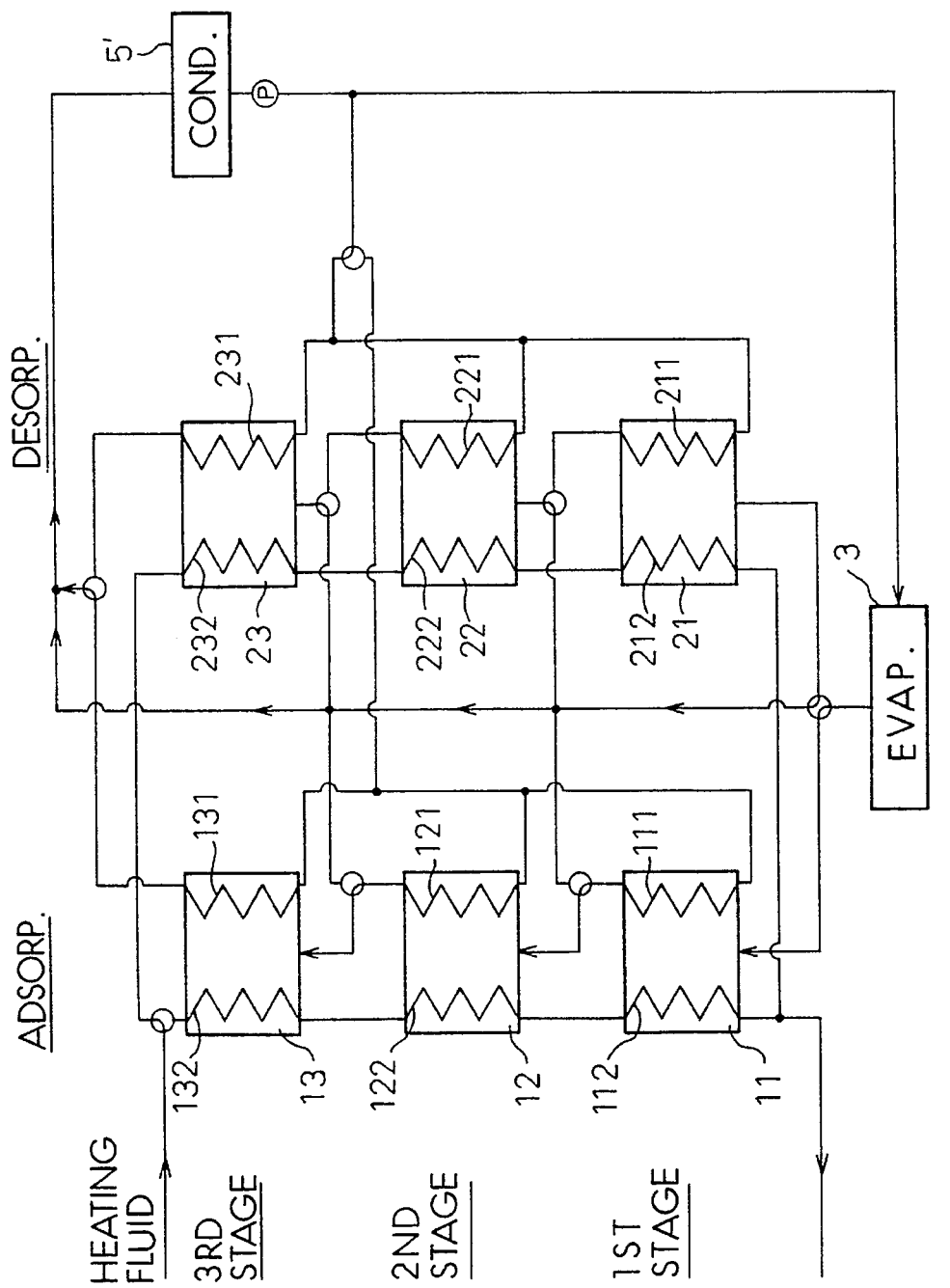
FIG. 5 is a system structural diagram indicating an adsorptive type refrigeration apparatus as a modification of the first embodiment.

FIG. 5 indicates a three-stage apparatus as a modification of the first embodiment. Adsorbers 13 and 23 are disposed in the third-stage. Condenser 5', cooling pipes 131 and 231, and heating pipes 132 and 232 are disposed. Additionally, the foregoing description indicated an embodiment which employs water and silica gel as refrigerant and adsorbent, but another refrigerant such as alcohol or freon, or another adsorbent such as zeolite or activated charcoal, or a compound thereof can also be used. Moreover, adsorbents and refrigerants of differing types can also be employed in the first and second stages.

A pump driven by power to send water as refrigerant is employed in the first embodiment and the modification thereof, but it is also possible to dispose an aperture portion (i.e., a device such as a valve or capillary tube to generate pipe pressure loss) in this portion to and utilize pressure differential or drive force to omit the pump.

Figure 6:
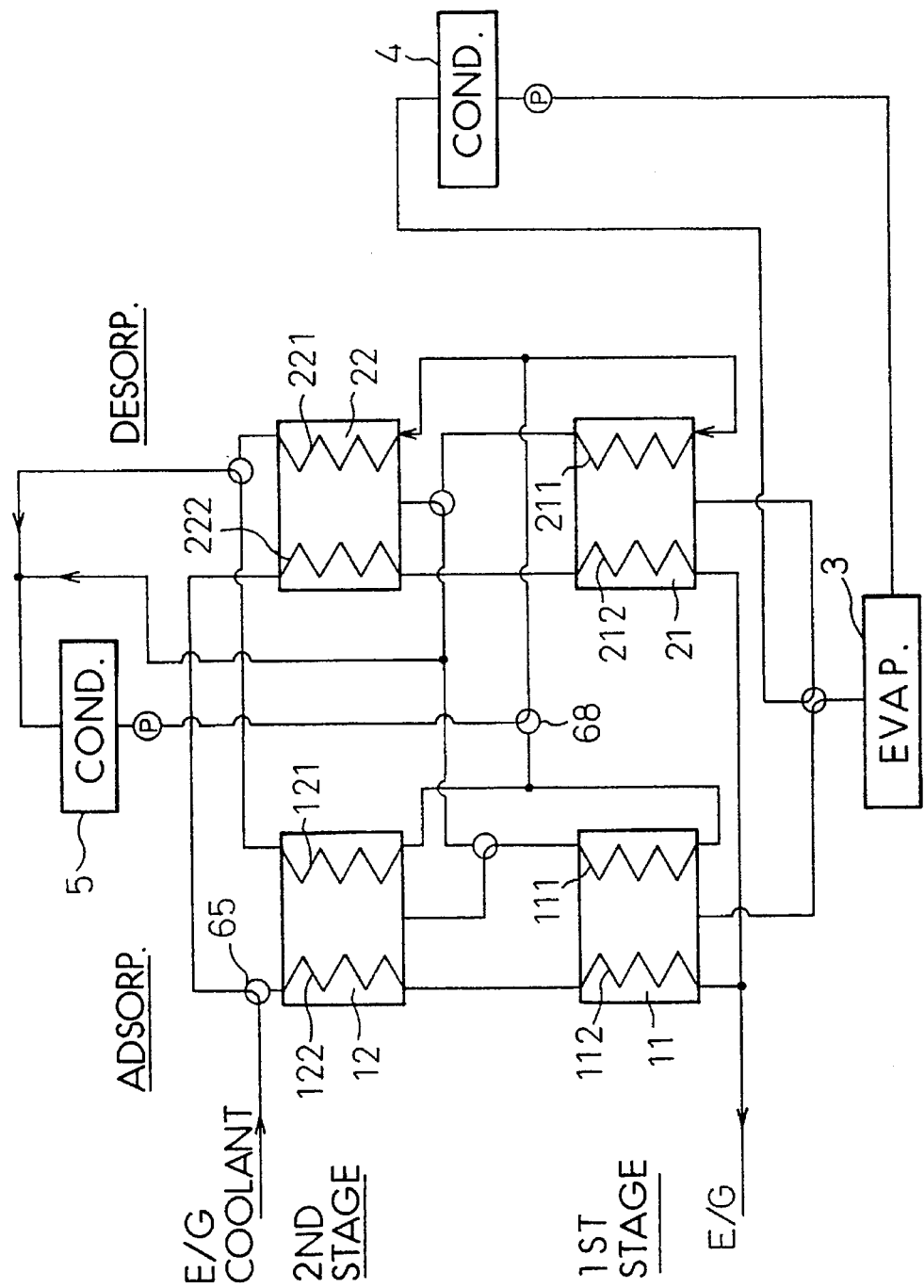
FIG. 6 is a system structural diagram indicating an adsorptive type refrigeration apparatus as a second embodiment.

A second embodiment indicated in FIG. 6 will be described hereinafter. In a case of the second embodiment as well, similarly to the first embodiment, adsorbers 11 and 12 on the left-hand side of FIG. 6 are in a state of adsorption, and adsorbers 21 and 22 on the right-hand side are in a state of desorption. The indication method of the drawings is identical hereinafter, up to the fifteenth embodiment. Additionally, in the second embodiment and a portion of embodiments thereafter, coolant water of an internal combustion engine is specifically exemplified as a heating fluid to cause refrigerant to be desorbed from adsorbent, and for this reason circulation passages to an internal combustion engine (indicated as "E/G" in the drawings) are illustrated in the drawings.

According to the second embodiment, water desorbed from adsorbent within the second-stage adsorber 22 is inducted to a condenser 5 and cooled, and this water is returned to cooling pipes 211 and 221 of the adsorbers 21 and 22. Additionally, water desorbed from adsorbent within the first-stage adsorber 21 is inducted to a condenser 4 and cooled, and this water is returned to an evaporator 3.

Furthermore, water within a cooling pipe 121 employed in adsorbent cooling within the adsorber 12 of the adsorption-process side is also inducted to the condenser 5 and cooled, and is returned to the cooling pipes 211 and 221 of the adsorbers 21 and 22.

In this way, according to the second embodiment, water from adsorbent within the adsorber 22 and water from adsorbent within the cooling pipe 121 of the adsorber 12 is cooled en masse in the condenser 5, and so there is a characteristic that the number of condensers is less than for the first embodiment, and two condensers are sufficient.

Furthermore, whereas the first embodiment required a three-way valve 64 to distribute water from the condenser 5 to the cooling pipe 121 of the adsorber 12 or the cooling pipe 221 of the adsorber 22, and a three-way valve 67 to distribute water from the condenser 4' to the cooling pipe 111 of the adsorber 11 or the cooling pipe 211 of the adsorber 21, the second embodiment also has a characteristic that water from the condenser 5 is distributed en masse to the cooling pipes 111 and 121 or cooling pipes 211 and 221, and a single three-way valve 68 is sufficient.

Moreover, because water passing through the evaporator 3 only flows within the adsorber 11 and within the adsorber 12 and up to the interior of the condenser 4, it is completely independent of water passing through other portions. For this reason, there is also a characteristic that a substance having properties most suited to the cooling temperature can be employed in refrigerant to cool the evaporator 3, and performance improvement can be expected thereby.

Figure 7:
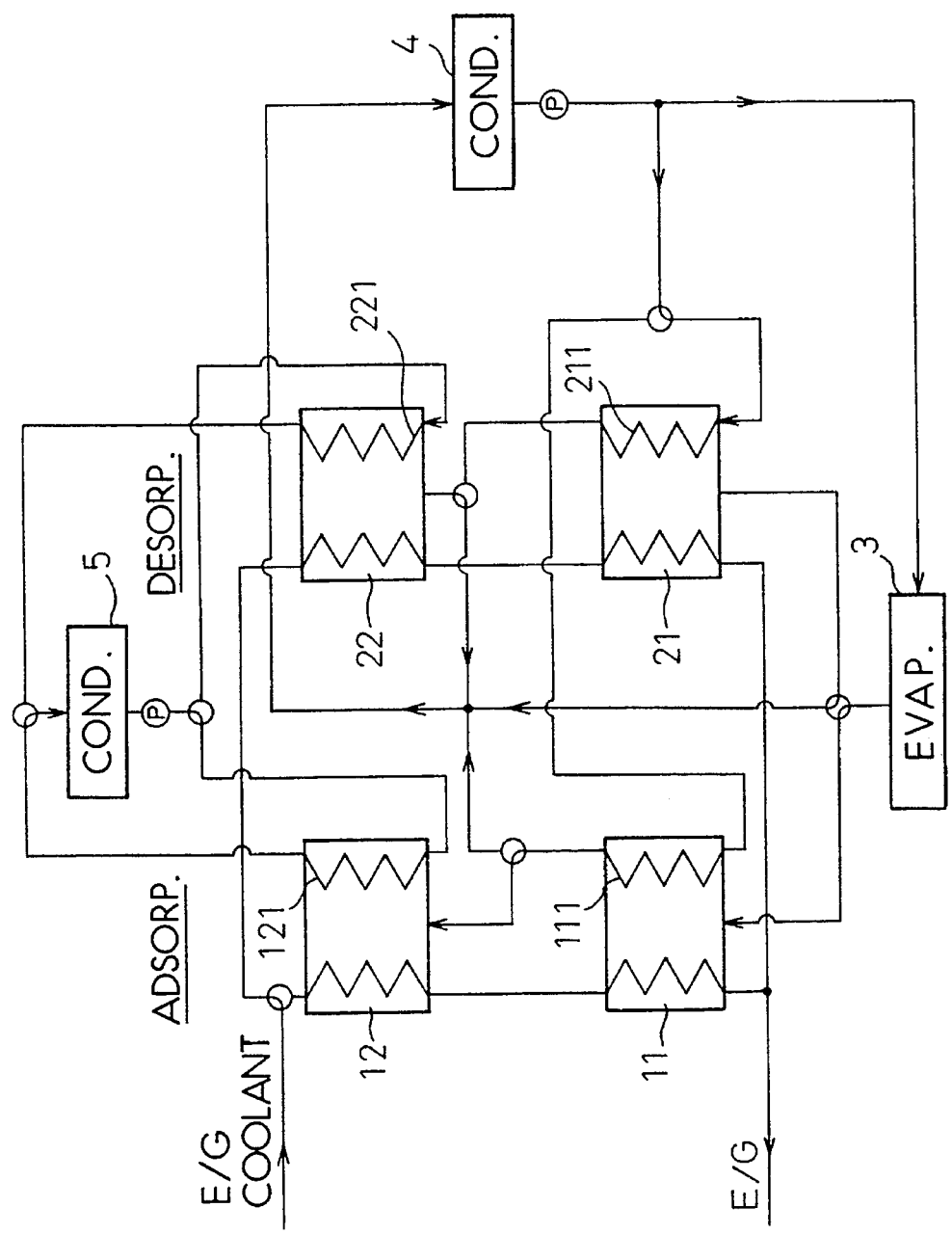
FIG. 7 is a system structural diagram indicating an adsorptive type refrigeration apparatus as a third embodiment.

A third embodiment indicated in FIG. 7 will be described hereinafter.

According to the third embodiment, water desorbed from adsorbent within a second-stage adsorber 22 on the right-hand side is inducted to a condenser 4 and cooled, and this water is returned to a cooling pipe 211 of an adsorber 21 and to an evaporator 3. Additionally, water desorbed from adsorbent within the first-stage adsorber 21 is also inducted to the condenser 4 and cooled, and this water is returned to 211 and the evaporator 3.

Furthermore, water within a cooling pipe 121 employed in adsorbent cooling within an adsorber 12 of an adsorption-process side is inducted to a condenser 5 and cooled, and is returned to the same cooling pipe 121.

In this way, according to the third embodiment, water from adsorbent within the adsorbers 22 and 21 is cooled en masse in the condenser 4, and so there is a characteristic that the number of condensers is less than for the first embodiment, and two condensers are sufficient.

Furthermore, because water passing through the condenser 5 passes only to within the cooling pipes 121 and 221 of the adsorbers 12 and 22, it is completely independent of water passing through other portions. For this reason, there is also a characteristic that a substance having properties most suited to performing heat radiation by outside air or the like can be employed in refrigerant to cool the second-stage adsorber 12 or 22, and that refrigerant which is water or the like may be caused to recirculate in a state open to outside air, and so on.

Figure 8:
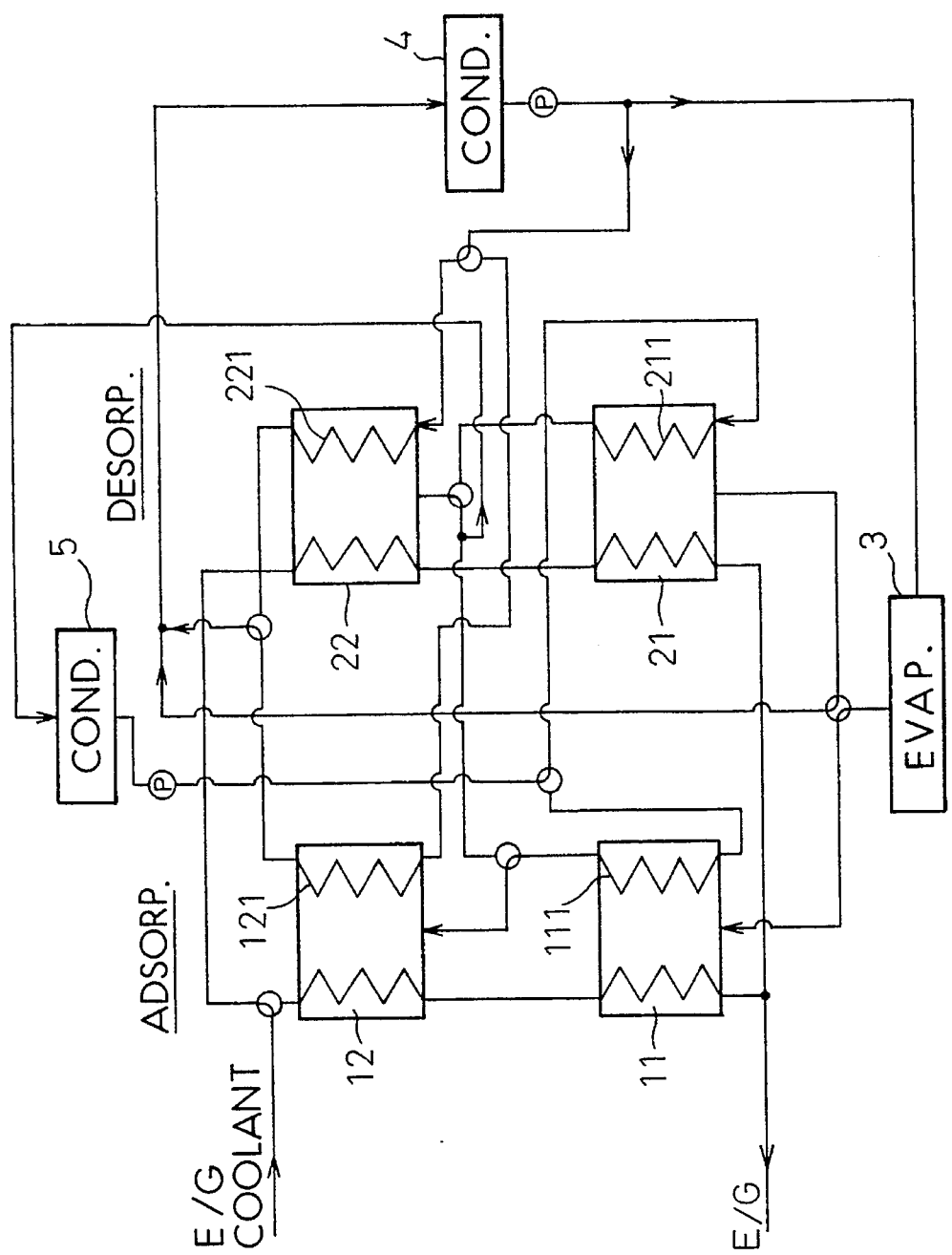
FIG. 8 is a system structural diagram indicating an adsorptive type refrigeration apparatus as a fourth embodiment.

A fourth embodiment indicated in FIG. 8 will be described hereinafter.

According to the fourth embodiment, water desorbed from adsorbent within a second-stage adsorption device 22 on the right-hand side is inducted to a condenser 5 and cooled, and this water is returned to a cooling pipe 211 of a first-stage adsorber 21. Additionally, water desorbed from adsorbent within the first-stage adsorber 21 is inducted to a condenser 4 and cooled, and this water is returned to a cooling pipe 221 of the second-stage adsorber 22 and to an evaporator 3.

Furthermore, water within a cooling pipe 121 employed in adsorbent cooling within an adsorber 12 of an adsorption-process side is also inducted to the condenser 4, cooled, and returned to the cooling pipe 221.

In this way, according to the fourth embodiment, water from adsorbent within the adsorber 21 and water from the cooling pipe 121 is cooled en masse in the condenser 4, and so there is a characteristic that the number of condensers is less than for the first embodiment, and two condensers are sufficient.

Figure 9:
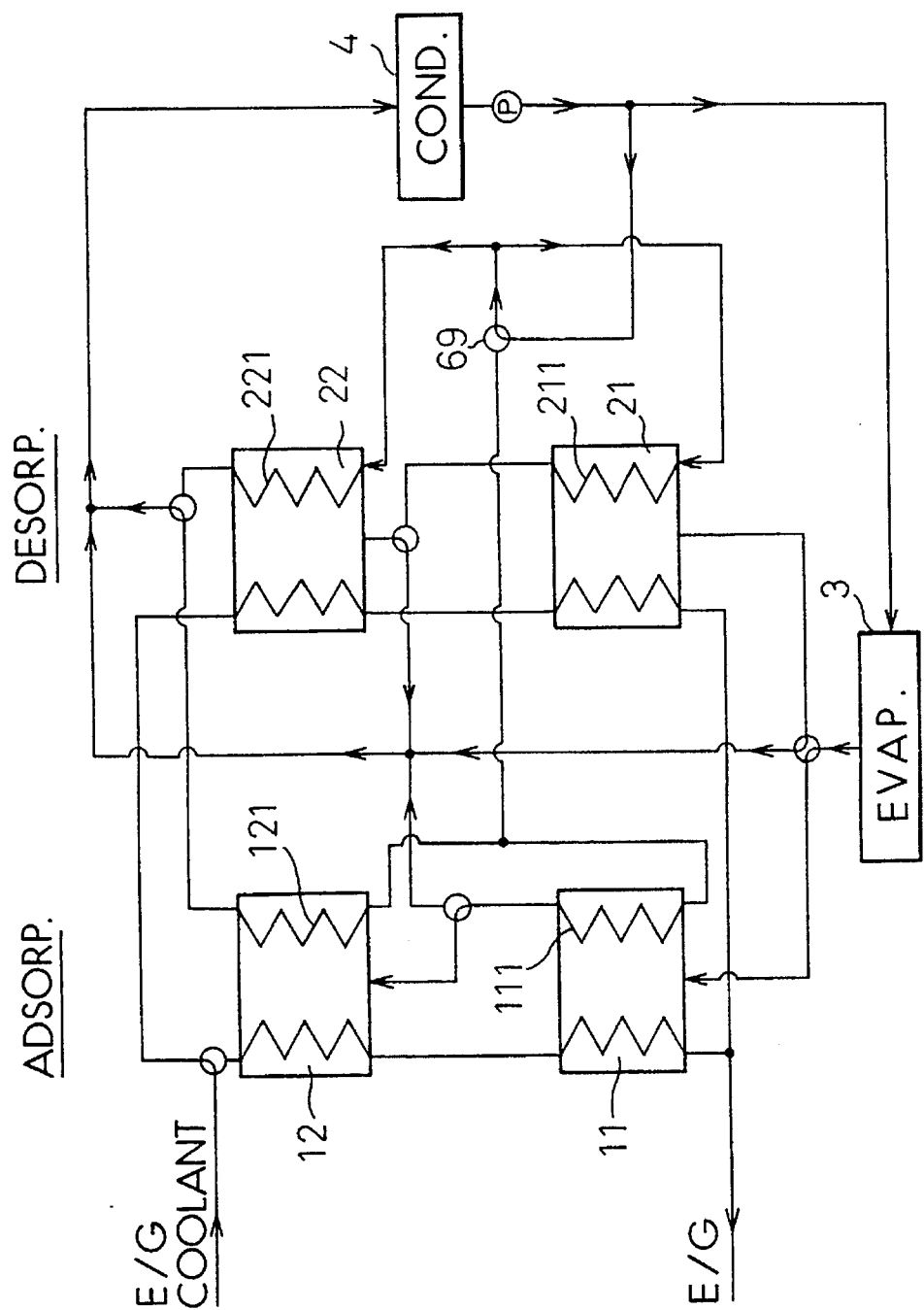
FIG. 9 is a system structural diagram indicating an adsorptive type refrigeration apparatus as a fifth embodiment.

A fifth embodiment indicated in FIG. 9 will be described hereinafter.

According to the fifth embodiment, water desorbed from adsorbent within a second-stage adsorber 22 on the right-hand side is inducted to a condenser 4 and cooled, and this water is returned to cooling pipes 221 and 211 and to an evaporator 3. Additionally, water desorbed from adsorbent within a first-stage adsorber 21 on the right-hand side is also inducted to the condenser 4 and cooled, and this water is returned to the cooling pipes 221 and 211 and to the evaporator 3.

Furthermore, water within a cooling pipe 121 employed in adsorbent cooling within an adsorber 12 of an adsorption-process side is also inducted to the condenser 4, cooled, and returned to the cooling pipes 221 and 211.

In this way, according to the fifth embodiment, water from adsorbent within the adsorbers 22 and 21 and water from the cooling pipe 121 is cooled en masse in the condenser 4, and so there is a characteristic that the number of condensers is less than for the first embodiment, and one condenser is sufficient.

Furthermore, whereas the first embodiment required a three-way valve 64 to distribute water from the condenser 5 to the cooling pipe 121 or 221 and a three-way valve 67 to distribute water from the condenser 4' to the cooling pipe 111 or 211, the fifth embodiment also has a characteristic that water from the condenser 4' is distributed en masse to the cooling pipes 111 and 121 or the cooling pipes 211 and 221, and a single three-way valve 69 for this portion is sufficient.

Figure 10:
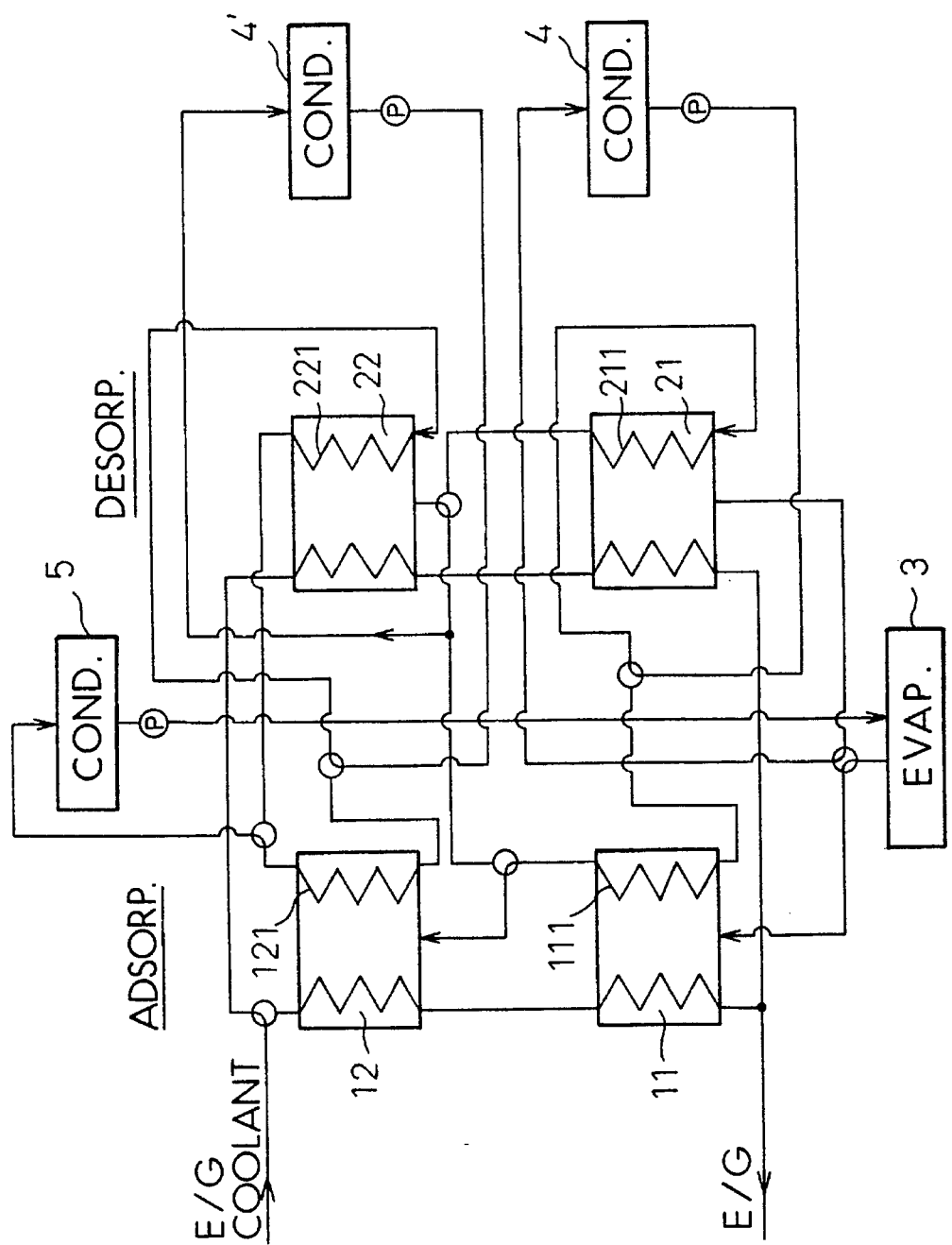
FIG. 10 is a system structural diagram indicating an adsorptive type refrigeration apparatus as a sixth embodiment.

A sixth embodiment indicated in FIG. 10 will be described hereinafter.

According to the sixth embodiment, water desorbed from adsorbent within a second-stage adsorption device 22 on the right-hand side is inducted to a condenser 4' and cooled, and this water is returned to a cooling pipe 221. Additionally, water desorbed from adsorbent within a first-stage adsorber 21 on the right-hand side is inducted to a condenser 4 and cooled, and this water is returned to a cooling pipe 211.

Furthermore, water within a cooling pipe 121 employed in adsorbent cooling within an adsorber 12 of an adsorption-process side is inducted to a condenser 5, cooled, and returned to an evaporator 3.

Figure 11:
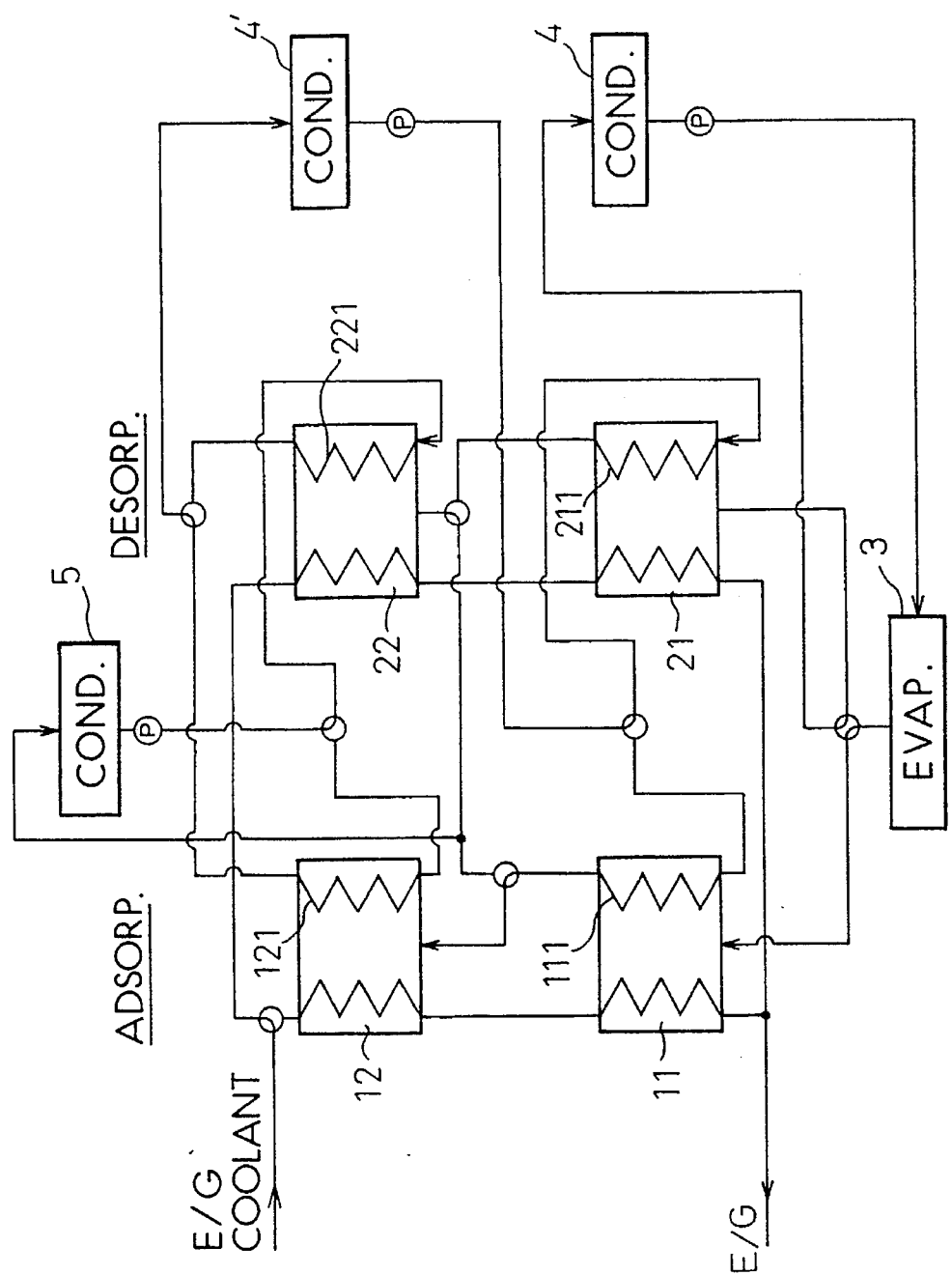
FIG. 11 is a system structural diagram indicating an adsorptive type refrigeration apparatus as a seventh embodiment.

A seventh embodiment indicated in FIG. 11 will be described hereinafter.

According to the seventh embodiment, water desorbed from adsorbent within a second-stage adsorber 22 on the right-hand side is inducted to a condenser 5 and cooled, and this water is returned to a cooling pipe 221. Additionally, water desorbed from adsorbent within a first-stage adsorber 21 on the right-hand side is inducted to a condenser 4 and cooled, and this water is returned to an evaporator 3.

Furthermore, water within a cooling pipe 121 employed in adsorbent cooling within an adsorber 12 of an adsorption-process side is inducted to a condenser 4', cooled, and returned to a cooling pipe 211.

In this case, because water passing through the evaporator 3 only flows within the adsorber 11 or 12 and through the condenser 4, it is completely independent of water passing through other portions. For this reason, there is also a characteristic that a substance having properties most suited to the cooling temperature can be employed in refrigerant to cool the evaporator 3, and performance improvement can be expected thereby.

Figure 12:
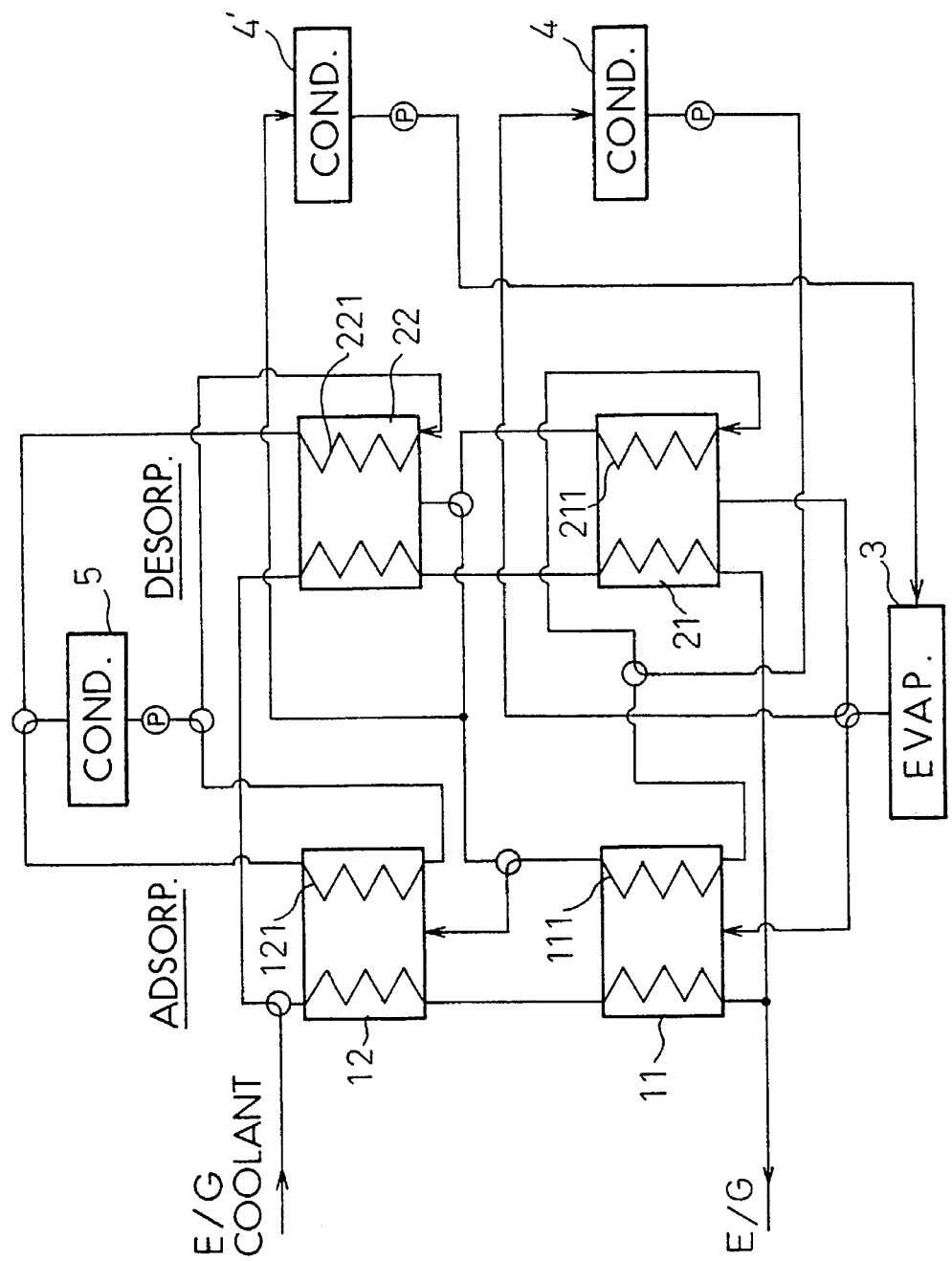
FIG. 12 is a system structural diagram indicating an adsorptive type refrigeration apparatus as an eighth embodiment.

An eighth embodiment indicated in FIG. 12 will be described hereinafter.

According to the eighth embodiment, water desorbed from adsorbent within a second-stage adsorber 22 on the right-hand side is inducted to a condenser 4' and cooled, and this water is returned to an evaporator 3. Additionally, water desorbed from adsorbent within a first-stage adsorber 21 on the right-hand side is inducted to a condenser 4 and cooled, and this water is returned to a cooling pipe 211.

Furthermore, water within a cooling pipe 121 employed in adsorbent cooling within an adsorber 12 of an adsorption-process side is inducted to a condenser 5, cooled, and returned to a cooling pipe 121.

Because water passing through the condenser 5 flows only to the cooling pipe 121 or 221, it is completely independent of water passing through other portions. For this reason, there is also a characteristic that a substance having properties most suited to performing heat radiation by outside air or the like can be employed in refrigerant to cool the second-stage adsorber 12 or 22, and that refrigerant which is water or the like may be recirculated in a state open to outside air, and so on.

Figure 13:
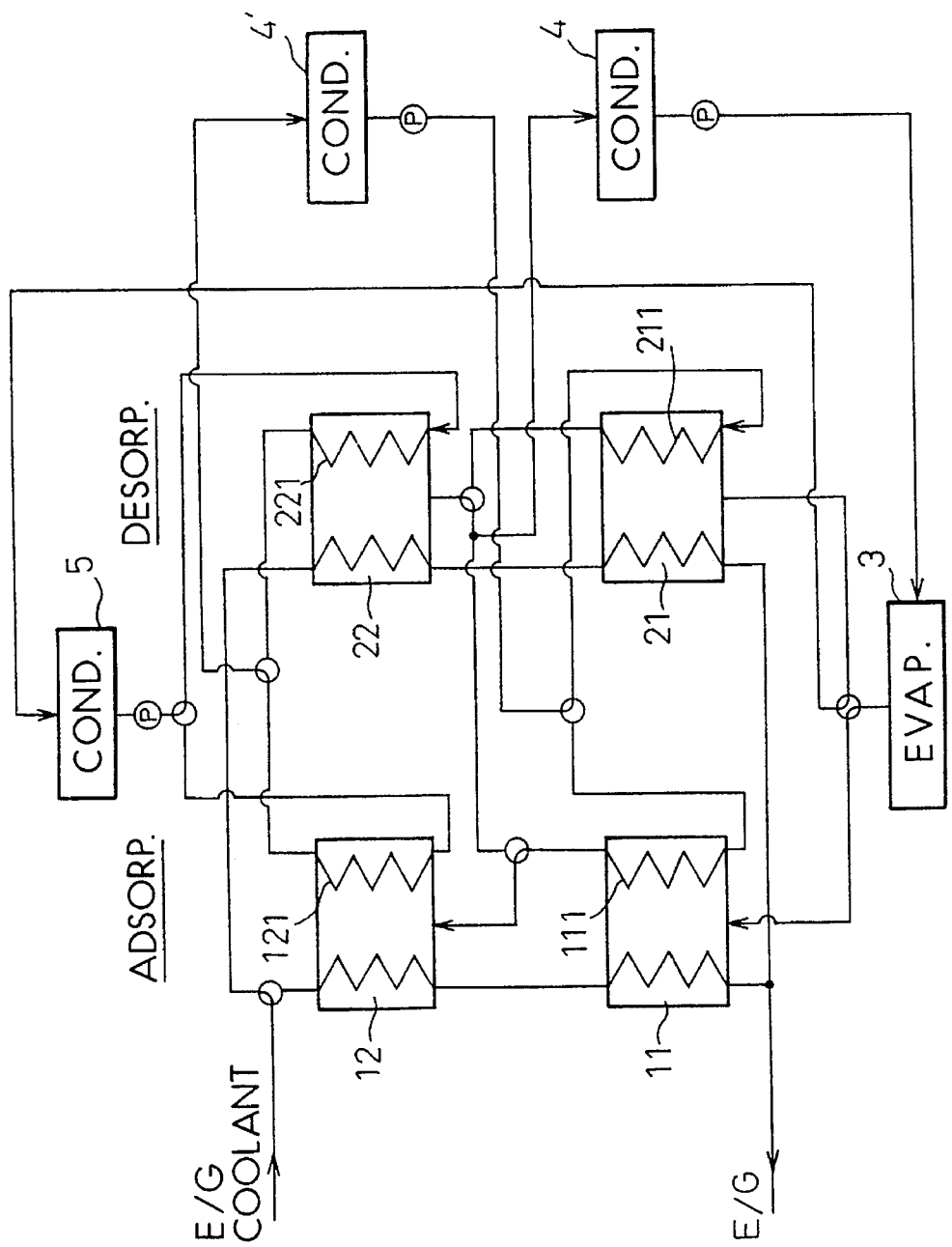
FIG. 13 is a system structural diagram indicating an adsorptive type refrigeration apparatus as a ninth embodiment.

A ninth embodiment indicated in FIG. 13 will be described hereinafter.

According to the ninth embodiment, water desorbed from adsorbent within a second-stage adsorber 22 on the right-hand side is inducted to a condenser 4 and cooled, and this water is returned to an evaporator 3. Additionally, water desorbed from adsorbent within a first-stage adsorber 21 on the right-hand side is inducted to a condenser 5 and cooled, and this water is returned to a cooling pipe 221.

Furthermore, water within a cooling pipe 121 employed in adsorbent cooling within an adsorber 12 of an adsorption-process side is inducted to a condenser 4', cooled, and returned to a cooling pipe 211.

Figure 14:
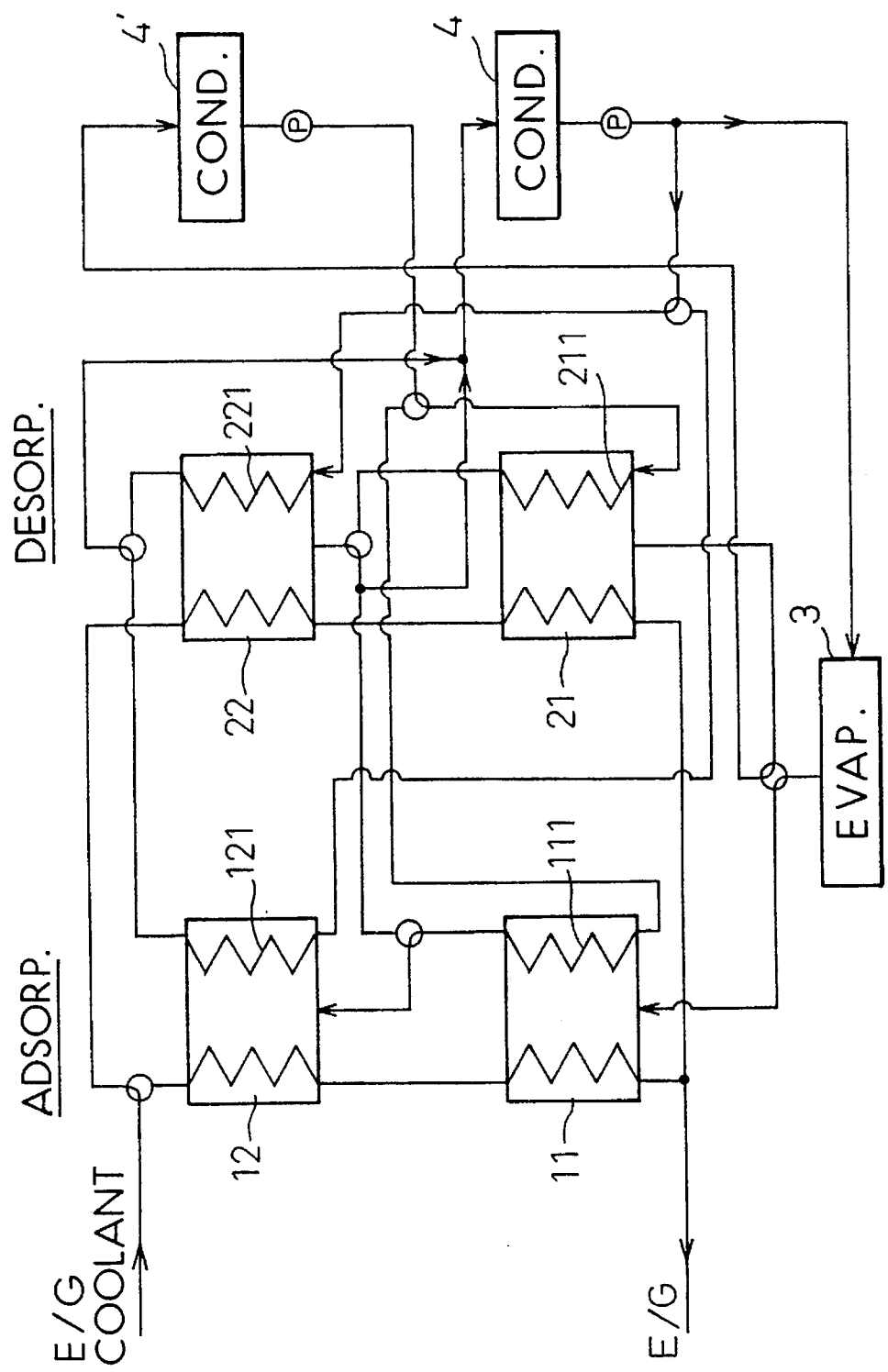
FIG. 14 is a system structural diagram indicating an adsorptive type refrigeration apparatus as a tenth embodiment.

A tenth embodiment indicated in FIG. 14 will be described hereinafter.

According to the tenth embodiment, water desorbed from adsorbent within a second-stage adsorber 22 on the right-hand side is inducted to a condenser 4 and cooled, and this water is returned to 221 and an evaporator 3. Additionally, water desorbed from adsorbent within a first-stage adsorber 21 on the right-hand side is inducted to a condenser 4' and cooled, and this water is returned to a cooling pipe 211.

Furthermore, water within a cooling pipe 121 employed in adsorbent cooling within an adsorber 12 of an adsorption-process side is inducted to a condenser 4, cooled, and returned to the cooling pipe 221 and the evaporator 3.

In this way, according to the tenth embodiment, water from adsorbent within the adsorber 22 and water from the cooling pipe 121 is cooled en masse in the condenser 4, and so there is a characteristic that the number of condensers is less than for the first embodiment, and two condensers are sufficient.

Figure 15:
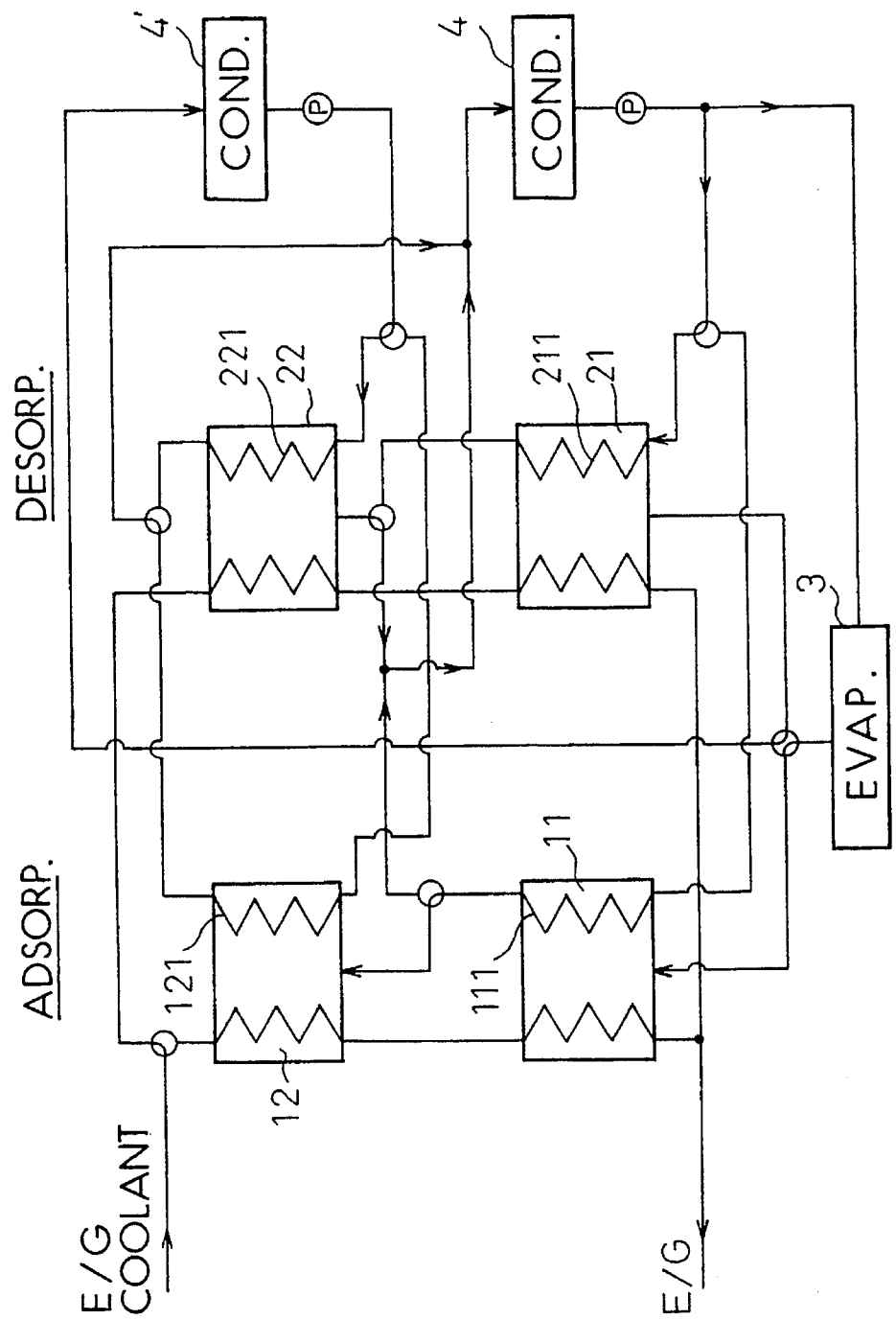
FIG. 15 is a system structural diagram indicating an adsorptive type refrigeration apparatus as an eleventh embodiment.

An eleventh embodiment indicated in FIG. 15 will be described hereinafter.

According to the eleventh embodiment, water desorbed from adsorbent within a second-stage adsorber 22 on the right-hand side is inducted to a condenser 4 and cooled, and this water is returned to a cooling pipe 211 and an evaporator 3. Additionally, water desorbed from adsorbent within a first-stage adsorber 21 on the right-hand side is inducted to a condenser 4' and cooled, and this water is returned to a cooling pipe 221.

Furthermore, water within a cooling pipe 121 employed in adsorbent cooling within an adsorber 12 of an adsorption-process side is inducted to the condenser 4, cooled, and returned to the cooling pipe 221 and the evaporator 3.

In this way, according to the eleventh embodiment, water from adsorbent within the adsorber 22 and water from the cooling pipe 121 is cooled en masse in the condenser 4, and so there is a characteristic that the number of condensers is less than for the first embodiment, and two condensers are sufficient.

Figure 16:
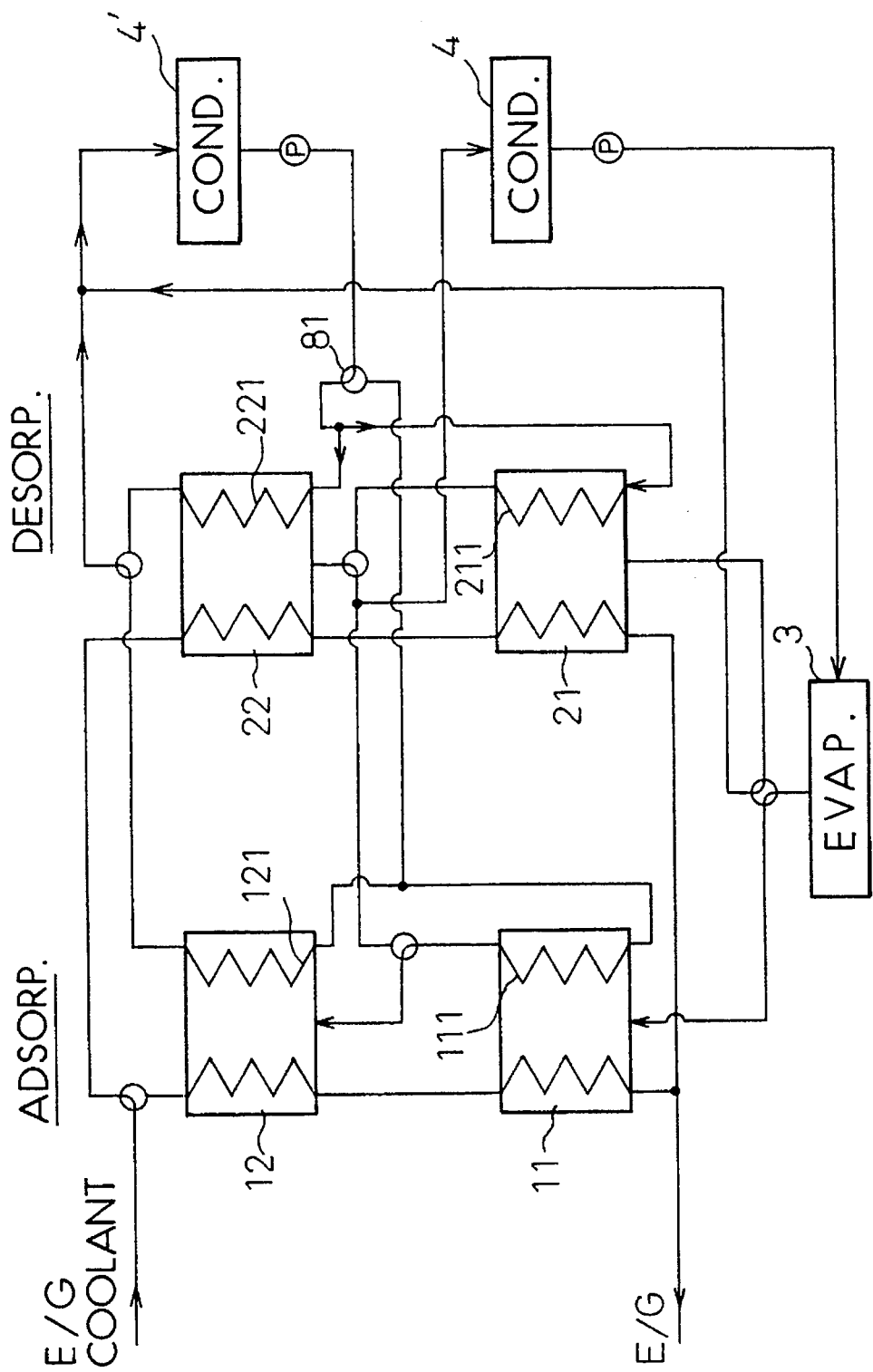
FIG. 16 is a system structural diagram indicating an adsorptive type refrigeration apparatus as a twelfth embodiment.

A twelfth embodiment indicated in FIG. 16 will be described hereinafter.

According to the twelfth embodiment, water desorbed from adsorbent within a second-stage adsorber 22 on the right-hand side is inducted to a condenser 4 and cooled, and this water is returned to an evaporator 3. Additionally, water desorbed from adsorbent within a first-stage adsorber 21 on the right-hand side is inducted to a condenser 4' and cooled, and this water is returned to cooling pipes 221 and 211.

Furthermore, water within a cooling pipe 121 employed in adsorbent cooling within an adsorber 12 of an adsorption-process side is also inducted to the condenser 4', cooled, and returned to the cooling pipes 221 and 211.

In this way, according to the twelfth embodiment, water from adsorbent within the adsorber 21 and water from the cooling pipe 121 is cooled en masse in the condenser 4', and so there is a characteristic that the number of condensers is less than for the first embodiment, and two condensers are sufficient.

Furthermore, whereas the first embodiment required a three-way valve 64 to distribute water from the condenser 5 to the cooling pipe 121 or 221 and a three-way valve 67 to distribute water from the condenser 4' to the cooling pipe 111 or 211, the twelfth embodiment also has a characteristic that water from the condenser 4' is distributed en masse to the cooling pipes 111 and 121 or the cooling pipes 211 and 221, and a single three-way valve 81 for this portion is sufficient.

Figure 17:
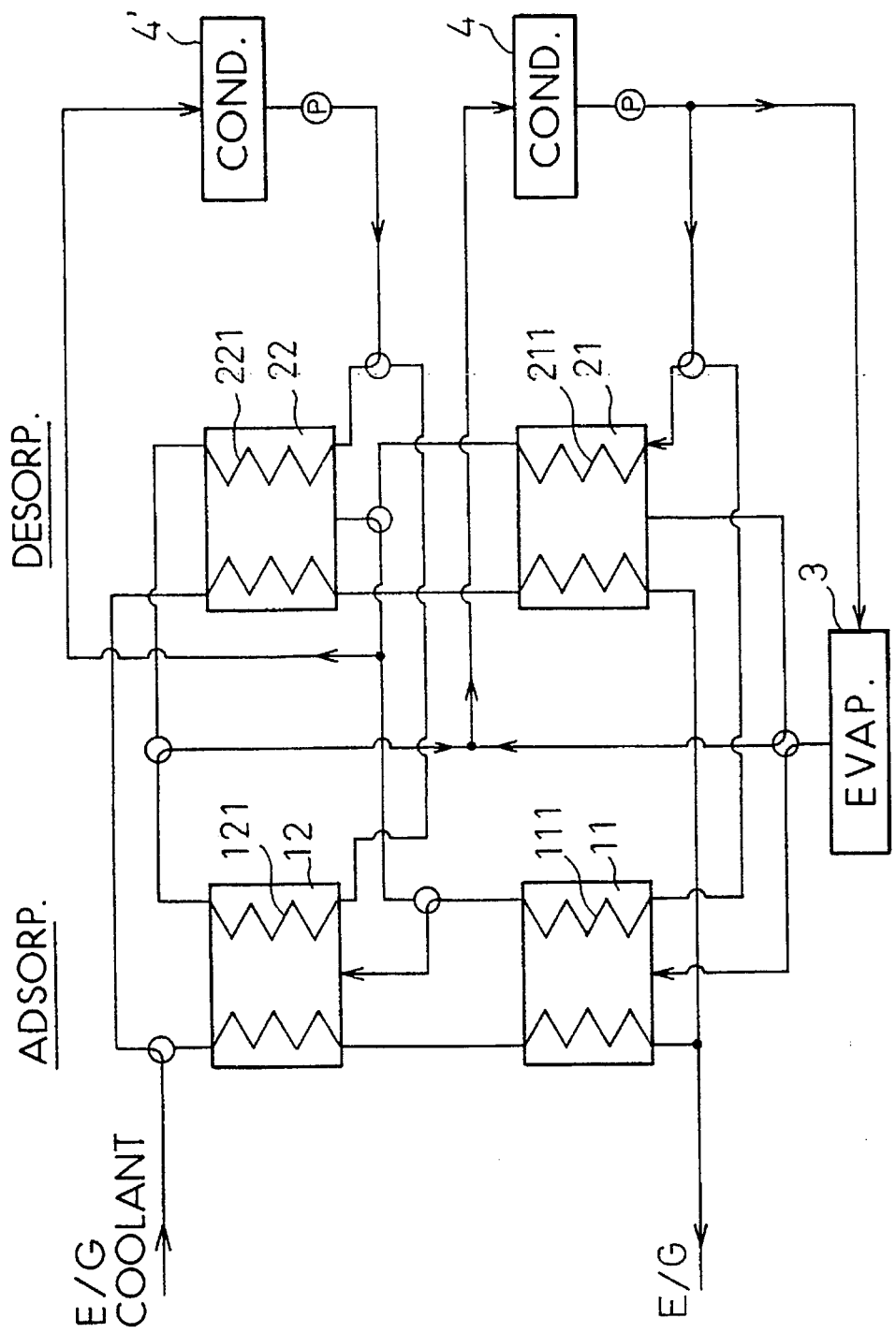
FIG. 17 is a system structural diagram indicating an adsorptive type refrigeration apparatus as a thirteenth embodiment.

A thirteenth embodiment indicated in FIG. 17 will be described hereinafter.

According to the thirteenth embodiment, water desorbed from adsorbent within a second-stage adsorber 22 on the right-hand side is inducted to a condenser 4' and cooled, and this water is returned to a cooling pipe 221. Additionally, water desorbed from adsorbent within a first-stage adsorber 21 on the right-hand side is inducted to a condenser 4 and cooled, and this water is returned to a cooling pipe 211 and an evaporator 3.

Furthermore, water within a cooling pipe 121 employed in adsorbent cooling within an adsorber 12 of an adsorption-process side is also inducted to the condenser 4, cooled, and returned to the cooling pipe 211 and the evaporator 3.

In this way, according to the thirteenth embodiment, water from adsorbent within the adsorber 21 and water from the cooling pipe 121 is cooled en masse in the condenser 4, and so there is a characteristic that the number of condensers is less than for the first embodiment, and two condensers are sufficient.

Figure 18:
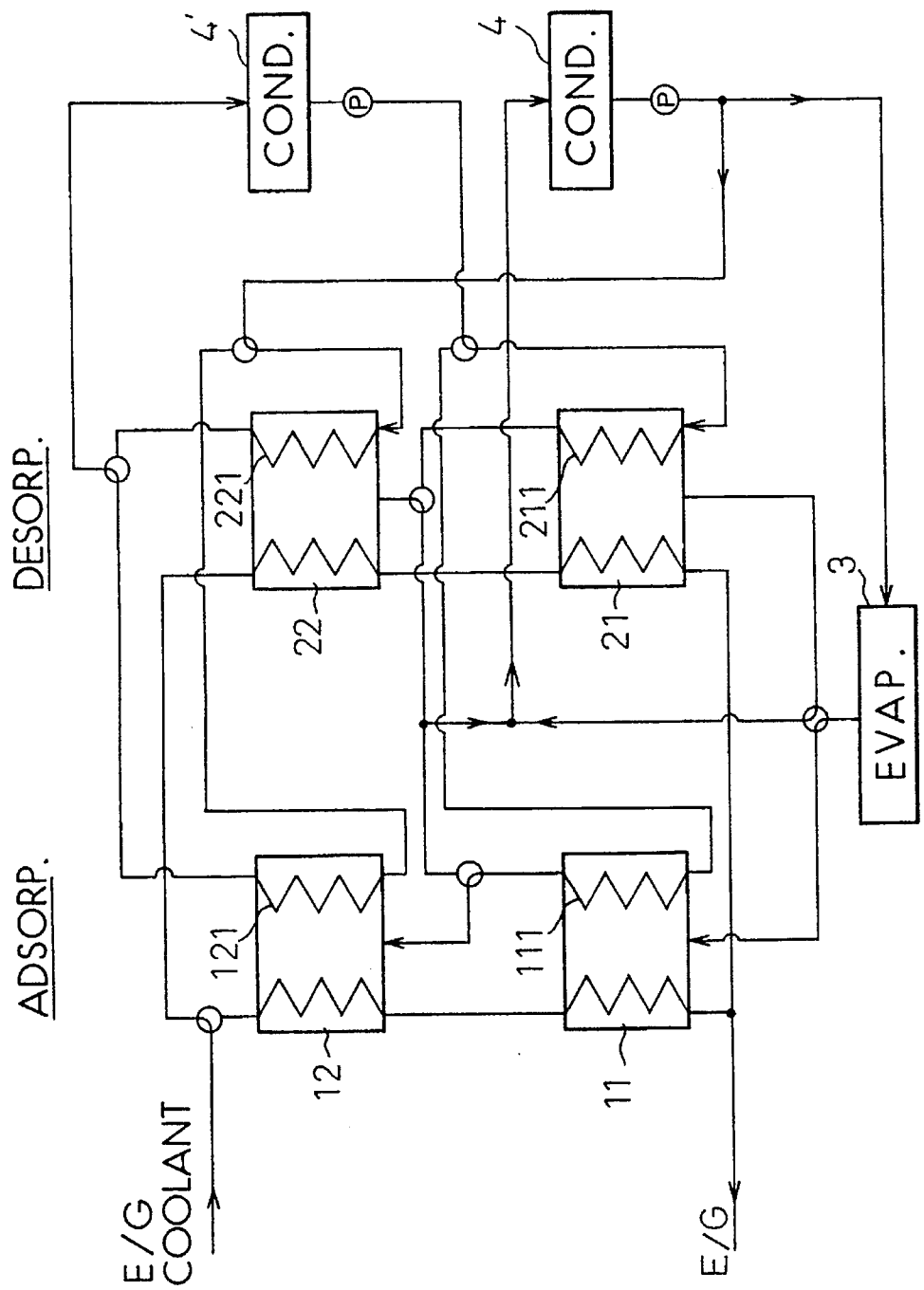
FIG. 18 is a system structural diagram indicating an adsorptive type refrigeration apparatus as a fourteenth embodiment.

A fourteenth embodiment indicated in FIG. 18 will be described hereinafter.

According to the fourteenth embodiment, water desorbed from adsorbent within a second-stage adsorber 22 on the right-hand side is inducted to a condenser 4 and cooled, and this water is returned to a cooling pipe 221 and an evaporator 3. Additionally, water desorbed from adsorbent within a first-stage adsorber 21 on the right-hand side is also inducted to the condenser 4 and cooled, and this water is returned to the cooling pipe 211 and the evaporator 3.

Furthermore, water within a cooling pipe 121 employed in adsorbent cooling within an adsorber 12 of an adsorption-process side is inducted to a condenser 4', cooled, and returned to the cooling pipe 211.

In this way, according to the fourteenth embodiment, water from adsorbent within the adsorbers 22 and 21 is cooled en masse in the condenser 4, and so there is a characteristic that the number of condensers is less than for the first embodiment, and two condensers are sufficient.

Figure 19:
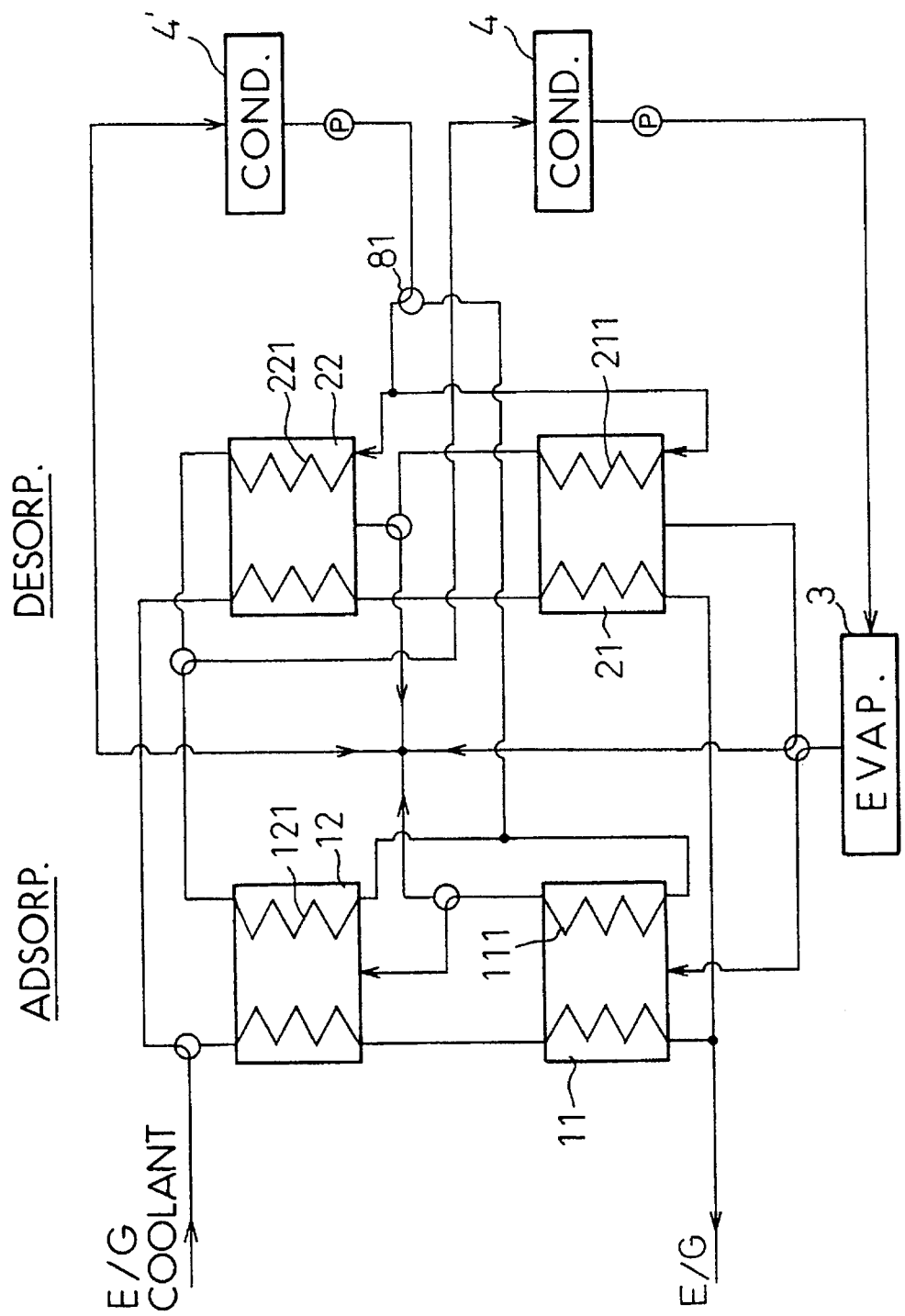
FIG. 19 is a system structural diagram indicating an adsorptive type refrigeration apparatus as a fifteenth embodiment.

A fifteenth embodiment indicated in FIG. 19 will be described hereinafter.

According to the fifteenth embodiment, water desorbed from adsorbent within a second-stage adsorber 22 on the right-hand side is inducted to a condenser 4' and cooled, and this water is returned to cooling pipes 221 and 211. Additionally, water desorbed from adsorbent within a first-stage adsorber 21 on the right-hand side is also inducted to the condenser 4 and cooled, and this water is returned to the cooling pipes 211 and 211.

Furthermore, water within a cooling pipe 121 employed in adsorbent cooling within an adsorber 12 of an adsorption-process side is inducted to a condenser 4, cooled, and returned to an evaporator 3.

In this way, according to the fifteenth embodiment, water from adsorbent within the adsorbers 22 and 21 is cooled en masse in the condenser 4', and so there is a characteristic that the number of condensers is less than for the first embodiment, and two condensers are sufficient.

Furthermore, whereas the first embodiment required a three-way valve 64 to distribute water from the condenser 5 to the cooling pipe 121 or 221 and a three-way valve 67 to distribute water from the condenser 4' to the cooling pipe 111 or 211, the fifteenth embodiment also has a characteristic that water from the condenser 4' is distributed en masse to the cooling pipes 111 and 121 or the cooling pipes 211 and 221, and a single three-way valve 81 for this portion is sufficient.

A sixteenth embodiment indicated in FIG. 20 will be described hereinafter. The sixteenth embodiment is formed by three adsorbers 11, 12, and 13, and six three-way valves 82, 83, 84, 85, 86, and 87 as well as four four-way valves 91, 92, 93, and 94 are used to switch passages. Opening and closing of these three-way valves and four-way valves is performed so that the numerals 1, 2, 3, and 4 inscribed respectively on the valves thereof in FIG. 20 are matched.

Figure 20:
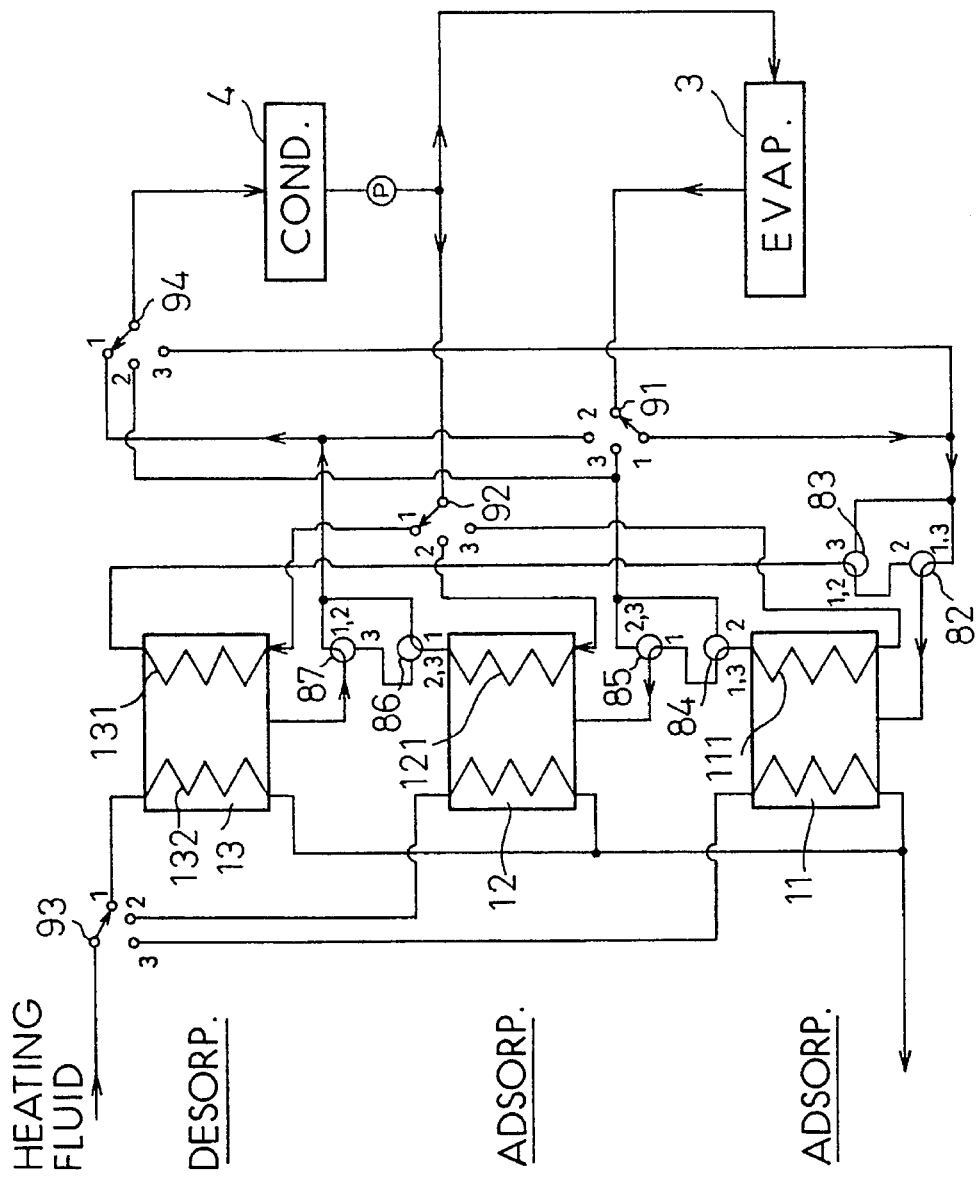
FIG. 20 is a system structural diagram indicating an adsorptive type refrigeration apparatus as a sixteenth embodiment.

In a state where the several valves are at the positions of 1 as shown in FIG. 20, the adsorber 11 is communicated with an evaporator 3, and plays a role as a first-stage adsorber. The adsorber 12 is communicated with a cooling pipe 111 of the adsorber 11, and plays a role as a second-stage adsorber. Whereas the adsorbers 11 and 12 are in an adsorption process, the adsorber 13 is heated by heating fluid which flows through a heating pipe 132, and is in a desorption process to discharge water from adsorbent in its interior.

Water within a cooling pipe 121 of the adsorber 12 which corresponds to a second stage is inducted to a condenser 4 and cooled, and is returned to a cooling pipe 131 and the an evaporator 3. Water discharged from adsorbent within the adsorber 13 which is in the desorption process is also inducted to the condenser 4, cooled, and returned to the cooling pipe 131 and the evaporator 3.

When the state indicated in FIG. 20 has continued, adsorption capacity of the adsorber 11 has dropped to approximately one-half of the original value and, along with this, adsorption capacity of the adsorber 12 has become substantially zero and adsorption capacity of the adsorber 13 has recovered to the original value, all valves (three-way valves and four-way valves) are switched from the positions of 1 to the positions of 2. Accordingly, the connection directions of the piping change, and the adsorber 13 is shifted to the first stage of the adsorption process, the adsorber 11 is shifted to the second stage of the adsorption process, or the adsorber 12 is shifted to the desorption process. When this state has continued and adsorption capacity of the adsorber 13 has dropped to approximately one-half of the original value, adsorption capacity of the adsorber 11 has become substantially zero, and adsorption capacity of the adsorber 12 has recovered to the original value, all valves (three-way valves and four-way valves) are switched from the positions of 2 to the positions of 3. It need hardly be said that at the positions of 3, the adsorber 11 assumes the desorption process and the adsorbers 12 and 13 assume the adsorption process. In this way, the valve positions are switched in a pattern of 1 →2→3→1→2→..., the roles of the adsorbers 11 to 13 change successively, and a continued cooling effect is obtained at the evaporator 3.

According to the sixteenth embodiment, sequential adsorption and desorption processes can be performed by the three adsorbers 11 to 13, and so there is a characteristic that the number of adsorbers can be made smaller in comparison with the case of the first embodiment (four adsorbers).

Figure 21:
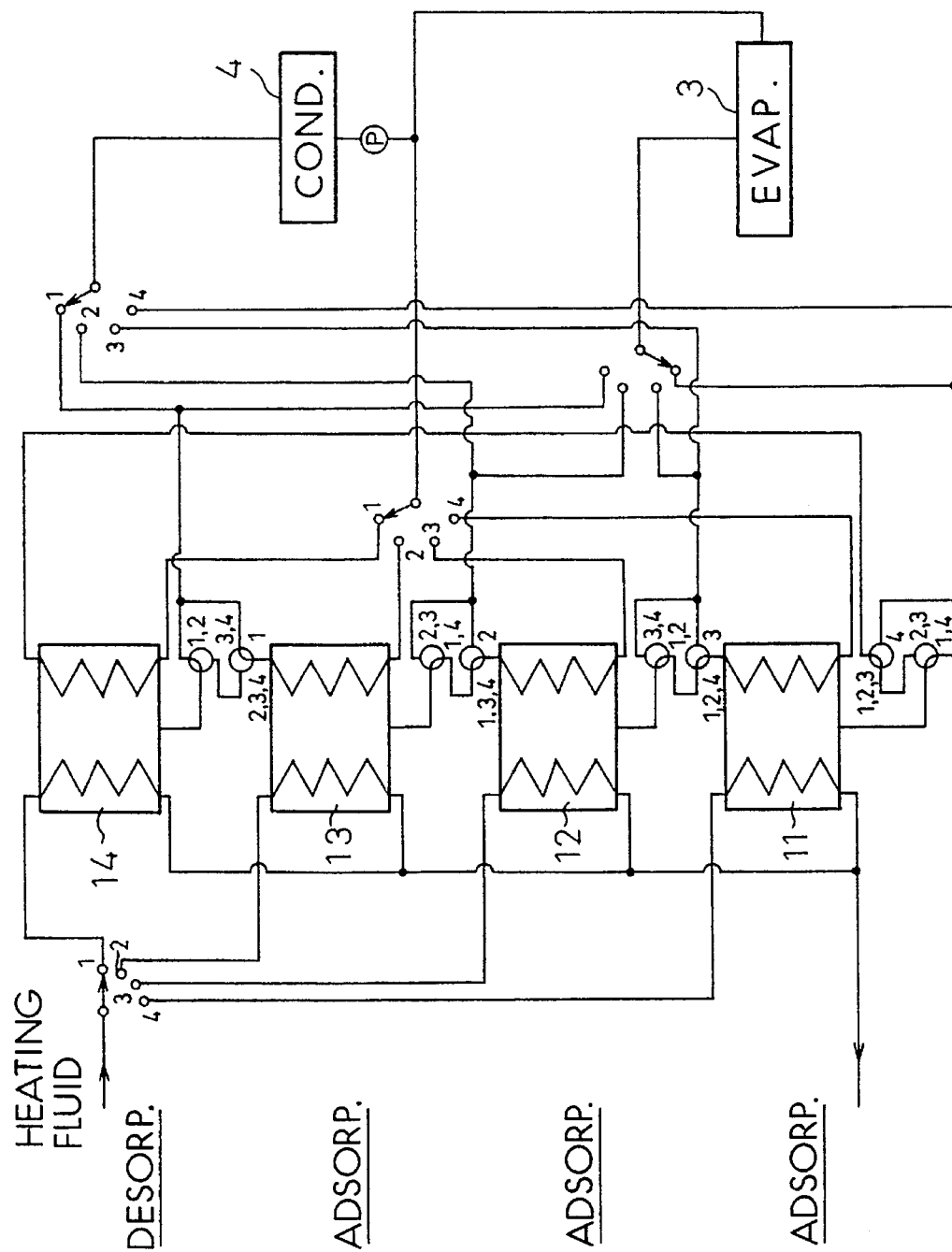
FIG. 21 is a system structural diagram indicating an adsorptive type refrigeration apparatus as a modification of the sixteenth embodiment.

Additionally, the sixteenth embodiment indicated an embodiment in a case where adsorbers of a total of three stages—i.e., first stage, second stage, and for desorption use—were employed, but as in a modification of the sixteenth embodiment indicated in FIG. 21, an embodiment employing adsorbers of a total of four stages—i.e., first stage, second stage, third stage, and for desorption use—or an embodiment employing still more adsorbers, is also possible. In FIG. 21, 14 indicates a fourth-stage adsorber.

Figure 22:
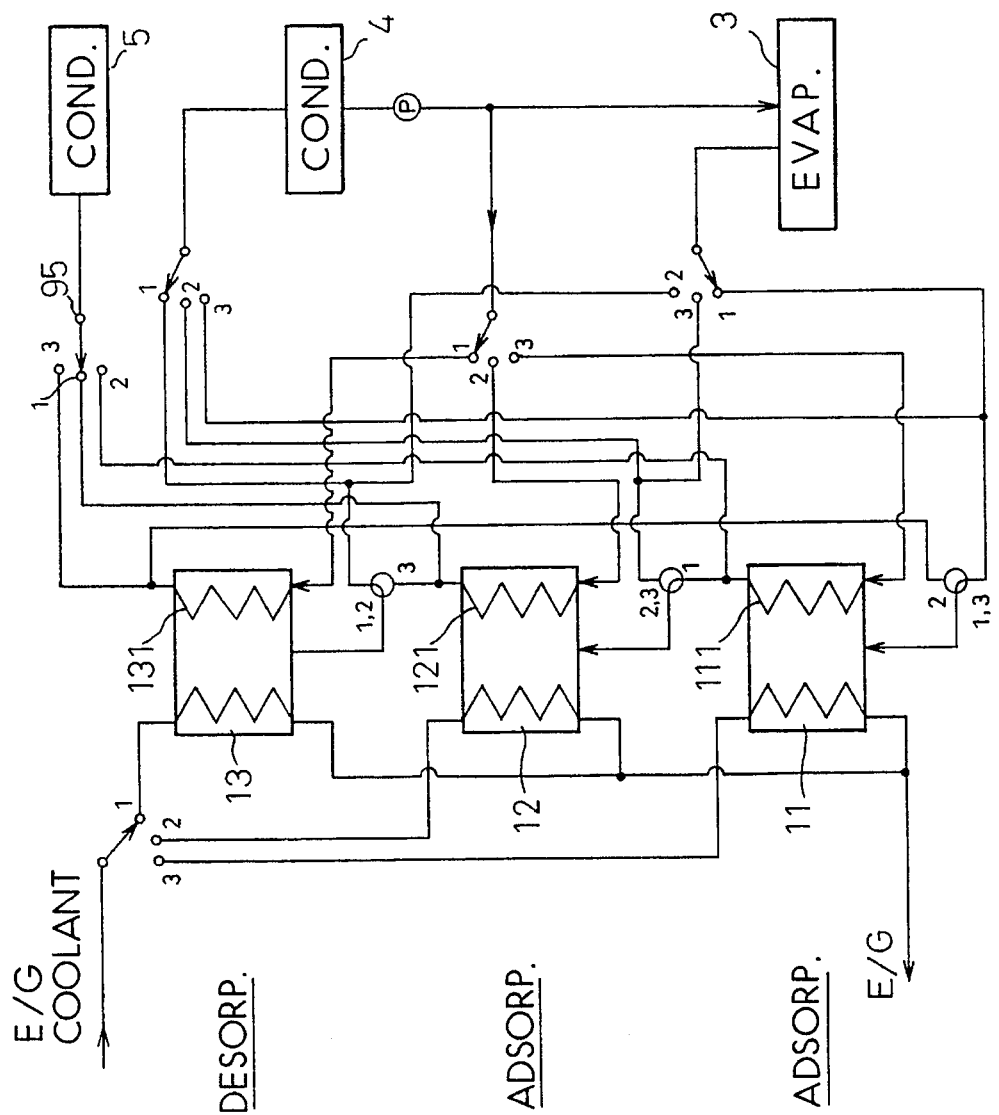
FIG. 22 is a system structural diagram Indicating an adsorptive type refrigeration apparatus as a seventeenth embodiment.

A seventeenth embodiment indicated in FIG. 22 will be described hereinafter. Because this embodiment has added a condenser 5 in comparison with the sixteenth embodiment indicated in FIG. 20, a four-way valve 95 is added in correspondence to this, but in other respects the two embodiments are substantially identical. In a state shown in FIG. 22, an adsorber 11 is communicated with an evaporator 3, and plays a role as a first-stage adsorber. An adsorber 12 is communicated with a cooling pipe 111 of the adsorber 11, and plays a role as a second-stage adsorber. Whereas these adsorbers 11 and 12 are in an adsorption process, an adsorber 13 is heated by heating fluid which flows through a heating pipe 132, and is in a desorption process to discharge water from adsorbent in its interior.

Water within a cooling pipe 121 of the adsorber 12 which corresponds to a second stage is inducted to the condenser 5 and cooled, and is returned by a heat-pump effect to the cooling pipe 121. Water discharged from adsorbent within the adsorber 13 which is in the desorption process is inducted to a condenser 4, cooled, and returned to a cooling pipe 131 and an evaporator 3. In other respects, mode of operation of valve switching and the like is identical with the sixteenth embodiment.

According to the seventeenth embodiment, sequential adsorption and desorption processes can be performed by the three adsorbers 11 to 13, and so there is a characteristic that the number of adsorbers can be made smaller in comparison with the case of the first embodiment (four adsorbers).

Figure 23:
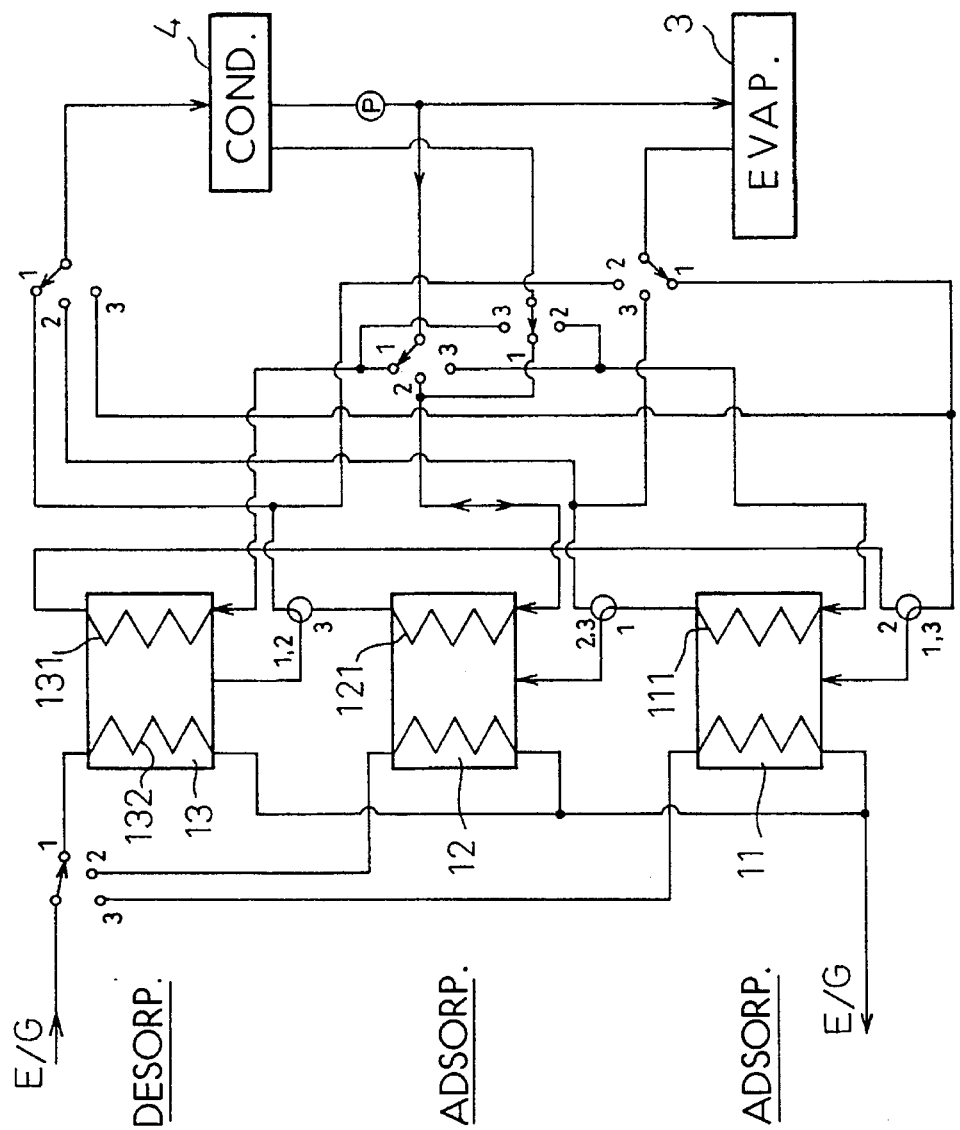
FIG. 23 is a system structural diagram indicating an adsorptive type refrigeration apparatus as an eighteenth embodiment.

An eighteenth embodiment indicated in FIG. 23 will be described hereinafter. The eighteenth embodiment corresponds to an apparatus which eliminates the three-way valves 83, 84, and 85 from the sixteenth embodiment indicated in FIG. 20. In a state shown in FIG. 23, an adsorber 11 is communicated with an evaporator 3, and plays a role as a first-stage adsorber. An adsorber 12 is communicated with a cooling pipe 111 of the adsorber 11, and plays a role as a second-stage adsorber. Whereas the adsorbers 11 and 12 are in an adsorption process, an adsorber 13 is heated by heating fluid which flows through a heating pipe 132, and is in a desorption process to discharge water from adsorbent in its interior.

Water within a cooling pipe 121 of the adsorber 12 which corresponds to a second stage is inducted to a condenser 4 and cooled, and is returned by a heat-pump effect to the cooling pipe 121. Water discharged from adsorbent within the adsorber 13 which is in the desorption process is inducted to a condenser 4, cooled, and returned to a cooling pipe 131 and an evaporator 3.

In other respects, mode of operation of valve switching and the like is identical with the sixteenth embodiment.

According to the eighteenth embodiment, sequential adsorption and desorption processes can be performed by the three adsorbers, and so there is a characteristic that the number of adsorbers can be made smaller in comparison with the case of the first embodiment (four adsorbers).

In the several embodiments of the present invention, 111, 121, 131, 211, 221, 231, and so on have been termed cooling pipes, but according to the present invention, these are not necessarily required to be devices of tube configuration to cause cooling fluid to flow, and because it is also acceptable for these to be devices having another configuration or structure as long as they are devices which can cool adsorbent within respective adsorbers, generally these should be termed cooling devices. Similarly, because the heating pipes 112, 122, 132, 212, 222, 232, and so on may be any devices as long as they are devices which can heat adsorbent within respective adsorbers, generally they should be termed heating devices.

A nineteenth embodiment indicated in FIG. 24 will be described hereinafter. Because the adsorbers 11, 12, 13, 14, 21, 22, 23, and so on in the first through eighteenth embodiments are all provided both with cooling pipes and with heating pipes, fluid such as water at a comparatively low temperature flows in the cooling pipes to cool adsorbent contained within the adsorber and cause to adsorb more water in an adsorption process, or fluid of comparatively high temperature such as water which exits a coolant-water jacket on an internal combustion engine flows in the heating pipes to heat adsorbent and cause to desorb (discharge) water adsorbed in the adsorbent in the desorption process. Consequently, when an operation state is switched for example from the adsorption process to the desorption in any one of the adsorbers, fluid of comparatively high temperature begins to flow to the heating pipe in a state where fluid of comparatively low temperature which flowed in the adsorption process remains in the cooling pipe. As a result of this, the fluid of comparatively high temperature which has begun to flow to the heating pipe is initially used to heat the fluid of comparatively low temperature which remains in the cooling pipe, and because adsorbent cannot be heated during this interval, there exists a problem wherein not only does operation response for switching become slow, but excessive heating capacity becomes necessary.

A similar problem occurs also when switching from the desorption process to the adsorption process in the same adsorber. In this case, fluid of comparatively low temperature begins to flow to the cooling pipe in a state where fluid of comparatively high temperature remains in the heating pipe, and so the fluid of comparatively low temperature which has begun to flow to the cooling pipe is initially used to cool the fluid of comparatively high temperature which remains in the heating pipe, and adsorbent cannot be cooled during this interval. Consequently, there not unexpectedly exists a problem wherein not only does operation response for switching become slow, but excessive cooling capacity becomes necessary. This necessity for excessive heating capacity and cooling capacity is linked to a correspondingly large size of the system.

In this regard, the nineteenth embodiment has a characteristic that functioning of the cooling pipe and heating pipe provided separately in the adsorber according to the above-described embodiments is caused to be performed en masse by a single cooling-heating pipe, while maintaining the fundamental characteristic of the present invention of cooling of an adsorber of a previous stage by an adsorber of a subsequent stage. Of course, provision of a single heat-transfer pipe in an adsorber and utilization to switch to both cooling and heating is itself priorly known, as is seen in Japanese Patent Application Laid-open No. 5-133638, but the nineteenth embodiment involves not merely the dual usage of a cooling-heating pipe such as this, but provision of the fundamental characteristic of the present invention that cooling of an adsorber of a previous stage is performed by an adsorber of a subsequent stage, and adsorption capacity of the adsorber of the previous stage, and consequently cooling capacity of the evaporator, is heightened. Accordingly, this characteristic is not disclosed in the prior art.

Structure of the nineteenth embodiment will be described hereinafter in specific terms with reference to FIG. 24. An evaporator 3 which cools air for cooling, a four-way valve 61, a condenser 4, and so on are similar to those according to the foregoing embodiments. As a characteristic of this embodiment, first-stage adsorbers 31 and 32 of the left-hand side and adsorbers 41 and 42 of the right-hand side are each provided with a single cooling-heating pipe, and these are indicated as 313, 323, 413, and 423. When either one of the respective interiors of the left-hand and right-hand first-stage adsorbers 31 and 41 which contain adsorbent is connected with the evaporator 3 for cooling use by switching of the four-way valve 61, the other is alternatively connected to the condenser 4 cooled by outside air.

Figure 24:
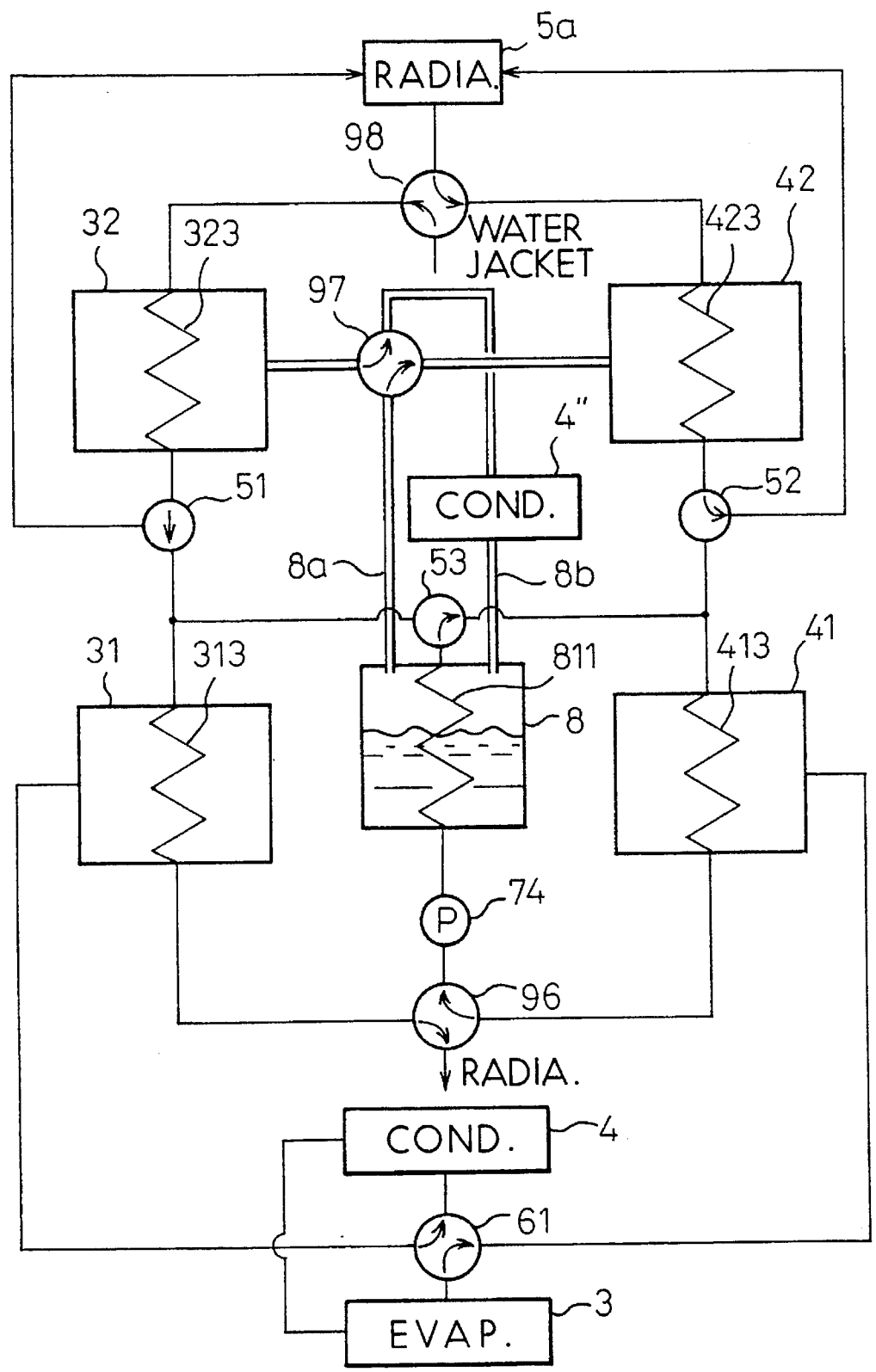
FIG. 24 is a system structural diagram indicating an adsorptive type refrigeration apparatus as a nineteenth embodiment.

When either one of lower ends of the cooling-heating pipes 313 and 413 disposed on the first-stage adsorbers 31 and 41 and indicated in FIG. 24 is connected with a heat radiator of an internal combustion engine (abbreviated as "E/G") by a four-way valve 96, the other is alternatively connected via a pump 74 to a container which makes coolant water to cool the adsorber 41, i.e., a lower end of a single heat-transfer pipe 811 which passes through an interior of an additional heat exchanger 8. In this case, water which is refrigerant is contained at a rated water quantity or more in the interior of the additional heat exchanger 8, and an outlet pipe 8a of water vapor in the interior is alternatively connected by a four-way valve 97 to either one of the respective interiors of the second-stage adsorbers 32 and 42 which contains adsorbent. Accordingly, the other interior of the second-stage adsorbers 32 and 42 is simultaneously connected via a condenser 4" to an inlet pipe 8b of the additional heat exchanger 8.

An upper end of the heat-transfer pipe 811 of the additional heat exchanger 8 is connected to either of respective upper ends of the cooling-heating pipes 313 and 413 of the first-stage adsorbers 31 and 41. These respective upper-end portions of the cooling-heating pipes 313 and 413 can be alternatively connected via respective three-way valves 51 and 52 to a lower end of the cooling-heating pipe 323 or 423 of the second-stage adsorbers 32 or 42. At the side not connected in this way, the lower end of the second-stage cooling-heating pipe 323 or 423 is connected to an inlet of a heat radiator 5a by the three-way valves 51 and 52. Accordingly, by switching of a four-way valve 98, either one of an upper end of the second-stage cooling-heating pipe 323 or 423 is connected to an outlet of the coolant-water jacket of the internal combustion engine in order to receive high-temperature coolant water as heating fluid, and along with this, another is connected to an outlet of the heat radiator 5a to receive low-temperature coolant water as cooling fluid.

Because the nineteenth embodiment indicated in FIG. 24 has this structure, an operating state thereof will be described hereinafter. In a state indicated in the drawing, the right-hand adsorbers 41 and 42 are in an adsorption process, and the left-hand adsorbers 31 and 32 are in a desorption process to discharge adsorbed water. Additionally, arrows in the drawing indicate direction of flow of refrigerant (at least a portion of which is coolant water of the internal combustion engine) in this state. It need hardly be said that operating states (adsorption process and desorption process) of the left- and right-hand adsorbers can be caused to be reversed by switching the three-way valves and four-way valves similarly to the above-described embodiments, and a cooling effect in the evaporator 3 can thereby be caused to be demonstrated.

In the state indicated in FIG. 24, hot water (coolant water) which has become a comparatively high temperature due to passage through the coolant-water jacket of the internal combustion engine passes through the four-way valve 98 and flows through the left-hand adsorbers 32 and 32 in the desorption process, and after heating adsorbent in interiors thereof and promoting desorption of adsorbed water, returns through the four-way valve 96 to the heat radiator of the internal combustion engine. Water vapor generated thereby within the adsorber 31 flows through the four-way valve 61 and to the condenser 4, is condensed by being cooled by outside air thereat, and again returns to the evaporator 3 and performs a cooling effect. Of course, this passage is independent of passages and the like which include the cooling-heating pipes within the several adsorbers through which coolant water of the internal combustion engine flows, and so a suitable refrigerant other than water can be used. Water vapor generated within the adsorber 32 flows through the four-way valve 97 to the condenser 4" and is cooled by outside air and condensed thereat and, along with this, water which has become low in temperature flows into the additional heat exchanger 8 from the inlet pipe 8b and is collected.

The adsorbers 41 and 42 of the right-hand side are in the adsorption process, but heat of adsorption generated when water vapor generated as a result of the cooling effect in the evaporator 3 is adsorbed by adsorbent within the adsorber 41 is absorbed by water flowing through the cooling-heating pipe 413. Because of this, the water in the cooling-heating pipe 413 becomes high in temperature, flows through the four-way valve 96 and into the heat-transfer pipe 811 of the additional heat exchanger 8 due to operation of the pump 74, is cooled by water which has collected within the additional heat exchanger 8, and again returns to the cooling-heating pipe 413 of the adsorber 41 and continues to cool adsorbent within the adsorber 41, and so temperature of the adsorbent is maintained at a low level and adsorption capacity is improved greatly, and cooling capacity is also heightened. Water collected within the additional heat exchanger 8 attempts to rise in temperature due to absorption of heat from the heat-transfer pipe 811, but because vaporization heat is usurped from the water collected within the additional heat exchanger 8 when a portion of the water evaporates, water temperature within the additional heat exchanger 8 is maintained at a low level. Accordingly, water vapor generated in the additional heat exchanger 8 is adsorbed in adsorbent within the adsorber 42.

In this case, coolant water which has exchanged heat with outside air and become comparatively low in temperature due to passage through the heat radiator 5a passes from the outlet of the heat radiator 5a and through the four-way valve 98 and cooling-heating pipe 423, and flows so as to again return to the inlet of the heat radiator 5a from the three-way valve 52, thereby cooling adsorbent within the adsorber 42, and so this adsorbent can adsorb a large amount of water vapor from the additional heat exchanger 8.

Because single cooling-heating pipes 313,323,413, and 423 are respectively disposed within the adsorbers 31, 32, 41, and 42 as a characteristic of the nineteenth embodiment, high-temperature or low-temperature water remaining within the several cooling-heating pipes when the left- and right-hand adsorption process and desorption process are switched is pressed out by the next batch of water which enters simultaneously with the switching, and so lingering thermal influence of the previous stage can be suppressed to a minimum, responsiveness of operation switching becomes high and, along with this, energy consumption becomes smaller and efficiency is improved, and contribution can be made to compactness of the system.

In the nineteenth embodiment indicated in FIG. 24, the first-stage (generally the (n)th) adsorber 41 and second-stage (generally the (n+1)th) adsorber 42 of the right-hand side and in the adsorption process are connected thermally in series, sandwiching the heat exchanger 8 therebetween, but as a more basic structure, the adsorber 41 and adsorber 42 can also be directly connected thermally in series without utilizing an additional heat exchanger 8. That is to say, as in the first embodiment indicated in FIG. 1, various modes are possible, such as a structure which connects the upper end of the cooling-heating pipe 413 of the adsorber 41 via a three-way valve to the interior of the adsorber 42 containing adsorbent and cools refrigerant flowing through the cooling-heating pipe 413 by causing it to be adsorbed directly by adsorbent within the adsorber 42 of the subsequent stage, so that the adsorber 42 performs cooling by coolant water of the internal combustion engine.

Finally, a twentieth embodiment indicated in FIG. 35 will be described hereinafter. Adsorbent utilized in the above-described embodiments was all disposed fixedly in adsorbers so that refrigerant such as water and vapor thereof flowed within the fixed adsorbent with no shifting thereof. Consequently, in order to continuously obtain a cooling effect while repeatedly performed an adsorption process and desorption (separation) process with regard to adsorbent within the individual adsorbers, it is necessary to provide for example two systems of adsorbers and operate these with repeated switching so that one performs the adsorption process while the other performs the desorption process. In an apparatus where the adsorption process and desorption process are uninterruptedly switched in this way, a certain extent of loss of energy and time during switching is perforce unavoidable. In this regard, a continuous cooling effect can be obtained even by a single adsorber when adsorbent of granular form in an interior of an adsorber is caused to flow circulatingly so that the adsorbent successively passes through a region to perform an adsorption process and a region to perform a desorption process within the adsorber. Systems based on this idea are disclosed in for example Japanese Patent Application Laid-open No. 2-203169 and Japanese Patent Application Laid-open No. 3-199864.

However, even in these systems, similarly to the above-described case of the prior art, it cannot be said that adsorption capacity of adsorbent is utilized sufficiently, and so the problem of large size of the system has not been solved. In this regard, the twentieth embodiment is an apparatus which applies a basic idea of the present invention in a refrigeration system which causes adsorbent to be shifted in this way in an attempt to heighten operating efficiency by sufficiently utilizing the capacity of the adsorbent. In this case as well, water is taken as an example of refrigerant in the description, but it need hardly be said that another refrigerant can be used.

Figure 25:
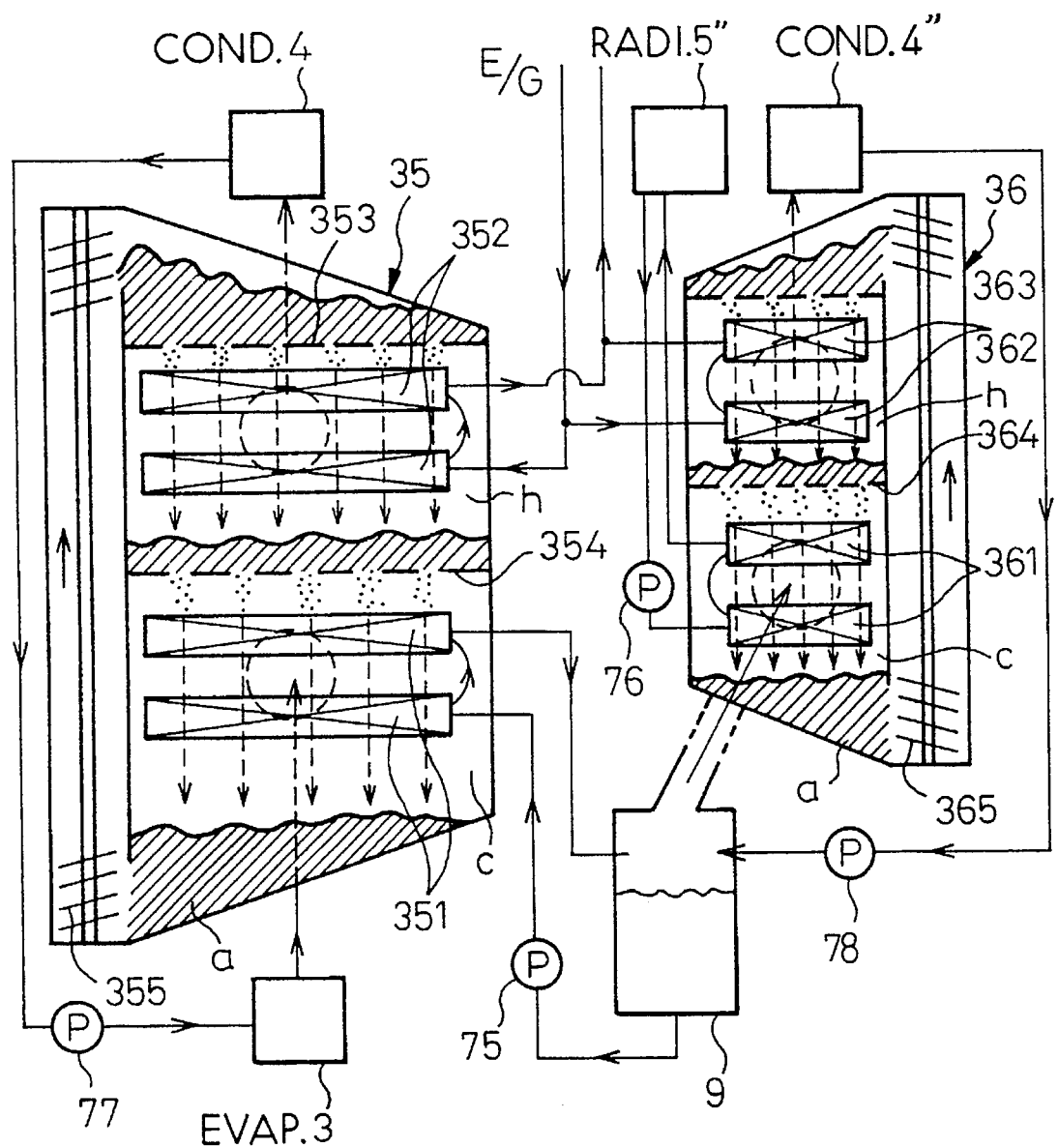
FIG. 25 is a system structural diagram indicating an adsorptive type refrigeration apparatus as a twentieth embodiment.

In FIG. 25, 35 and 36 are respective adsorbers as adsorption units, and two or more adsorbers are provided in the case of the twentieth embodiment as well. Because the adsorber 35 of the previous stage (n stage) and the adsorber 36 of the subsequent stage (n+1 stage) have a substantially identical structure, structure will be described hereinafter taking the adsorber 35 as an example. A cooling pipe 351 of a lower stage as a heat exchanger for cooling use and a heating pipe 352 of an upper stage as a heat exchanger for heating use are respectively disposed in an interior of a sealed casing of the adsorber 35. A porous plate 353 as an adsorbent-flow regulator is supported on an upper portion of the heating pipe 352, and a porous plate 354 as an adsorbent-flow regulator is supported on an lower portion of the heating pipe 352 which is an upper portion of the cooling pipe 351. Accordingly, a screw conveyor 355 as an adsorbent-transfer device is provided on a side on which a cross-section of the casing is enlarged to transfer adsorbent a vertically from a lower portion to an upper portion.

Space in the proximity of where the heating pipe 352 is disposed is a heating region h; that is to say, a region to heat granular adsorbent a which falls from holes in the porous plate 353 is formed. Space in the proximity of where the cooling pipe 351 is disposed is a cooling region c; that is to say, a region to cool granular adsorbent a which falls from holes in the porous plate 354 is formed. Water vapor generated in the heating region h is inducted by a passage opened to the heating region h to a condenser 4, cooled by outside air, and condensed to revert to water. The condenser 4 is connected via a passage and a pump 77 to an evaporator 3 of a lower portion, and in the evaporator a cooling effect is performed by heat exchange between water and room air. Water vapor generated in the evaporator 3 is inducted by a passage to the cooling region c and is adsorbed by adsorbent a which falls within the ambient air of the cooling region c which has become comparatively low in temperature.

The adsorber 36 of the subsequent stage has a structure which is substantially identical to the adsorber 35 of the previous stage, and a cooling pipe 361 of a lower stage, a heating pipe 362 of an upper stage, porous plates 363 and 364, and a screw conveyor 365 are respectively provided within a casing thereof in positions similar to the case of the adsorber 35 of the previous stage. In the adsorber 36 of the subsequent stage as well, water vapor generated in a heating region h in the proximity of the heating pipe 362 is inducted to a condenser 4' and cooled by outside air. The foregoing is identical with the case of the adsorber 35 of the previous stage, but in the case of the adsorber 36 of the subsequent stage water condensed in the condenser 4' is inducted to an additional heat exchanger 9 by a passage. In addition, a pump 78 is disposed intermediately in the passage.

Structure and related form of the additional heat exchanger 9 differs from the evaporator 3 to perform a cooling effect which is connected to the adsorber 35 of the previous stage; a liquid-phase portion of a lower portion of the additional heat exchanger 9 is connected to an inlet of the lower portion of the cooling pipe 351 of the adsorber 35 of the previous stage and, along with this, a gas-phase portion of an upper portion is connected to an outlet of the upper portion of the cooling pipe 351. Accordingly, a passage extending from the gas-phase portion of the upper portion of the additional heat exchanger 9 is opened to the cooling region c in the proximity of the cooling pipe 36 within the adsorption device 36 of the subsequent stage.

To cool the cooling region c of the adsorber 36 of the subsequent stage by outside air, a heat radiator 5" is connected to the cooling pipe 361 thereof via a pump 76 to structure a circulation center for refrigerant such as water. Depending on the case, the heat radiator 5" may also be caused to be a condenser to perform cooling of the cooling pipe 361 according to a cooling system accompanying evaporation of refrigerant. A coolant-water system of an internal combustion engine is connected to the heating pipes 352 and 362 to simultaneously heat in parallel the heating regions h of the adsorber 35 of the previous stage and the adsorber 36 of the subsequent stage. That is to say, inlet sides of the heating pipes 352 and 362 are respectively connected to an outlet of a coolant-water jacket of the engine and outlet sides are similarly connected respectively to an inlet or outlet of a heat radiator of the engine, so that the heating pipes 352 and 362 receive coolant water of comparatively high temperature and also return coolant water to the engine after utilization in heating of the heating region h.

Because the adsorptive type refrigeration system according to the twentieth embodiment indicated in FIG. 25 is structured in this way, operation thereof will be described hereinafter. Within the adsorber 35 of the previous stage, adsorbent a carried to the upper portion by the screw conveyor 355 is heated by the heating pipe 352 when it falls from holes in the porous plate 353, and so adsorbed water vapor is discharged (desorption effect). Consequently, adsorbent a depositing on the porous plate 354 contains essentially no moisture. The desiccated adsorbent a subsequently falls to the cooling region c from holes in the porous plate 354, but because the cooling pipe 351 is cooled and becomes low in temperature due to water supplied from the liquid-phase portion of the additional heat exchanger 9, the adsorbent a is also cooled, and as a result, the adsorption capacity of the adsorbent a rises considerably and adsorbs a large amount of water vapor inducted from the evaporator 3 (adsorption effect), as was described for the foregoing several embodiments.

Adsorbent a collected in a bottom portion of the adsorber 35 in this way contains a large quantity of moisture replete with adsorption capacity, but this is inducted toward the screw conveyor 355 by a tilted surface of the casing and is carried to the upper portion of the adsorber 35 by the screw conveyor 355 being driven by a power system not illustrated. The above-described operation is continuously repeated so that adsorbent a pushed atop the porous plate 353 adsorbs a large quantity of water vapor and again falls from the holes to the heating region h and is subjected to a desorption effect. As a result thereof, a completely continuous cooling effect which does not include switching time comes to be obtained in the evaporator 3.

Meanwhile, operation to cool, by the additional heat exchanger 9, water which is circulatingly supplied to the cooling pipe 351 of the adsorber 35 of the previous stage is performed in the adsorber 36 of the subsequent stage corresponding to a characteristic of the present invention. That is to say, water which has been cooled by the additional heat exchanger 9 becomes somewhat heated water (or, at times, water vapor) due to passage within the cooling pipe 351 of the previous stage, and again returns to within the additional heat exchanger 9. Water which has returned from the cooling pipe 351 and water which has returned from the condenser 4' is intermixed within the additional heat exchanger 9. Because of this, a portion of water within the additional heat exchanger 9 evaporates and is inducted to the cooling region c of the adsorber 36 of the subsequent stage. Because the cooling region c is within an ambience cooled by coolant water from the heat radiator 5" and adsorbent a which contains substantially no moisture falls from the porous plate 364, water vapor from the additional heat exchanger 9 is adsorbed by the adsorbent a in the cooling region c. Pressure within the additional heat exchanger 9 is reduced by this and moreover cooled by evaporation of water, and a comparatively low temperature is maintained.

As was made clear in the description regarding the adsorber 35 of the previous stage, in the adsorber 36 of the subsequent stage as well, adsorbent a which has adsorbed a large quantity of water in the cooling region c is deposited on a bottom of the casing and subsequently is carried to an upper portion by the screw conveyor 365, falls to the heating region h from holes in the porous plate 363, and adsorbed moisture is desorbed. To maintain the heating region h at a comparatively high temperature, high-temperature coolant water exiting from the coolant-water jacket of the internal combustion engine is inducted to the heating pipe 362, similarly to the heating pipe 352 of the previous stage. In this way, adsorbent a within the adsorber 36 of the subsequent stage substantially similarly to adsorbent a within the adsorber 35 of the previous stage.

According to the twentieth embodiment, adsorbent a is caused to circulate respectively within the adsorber 35 of the previous stage and the adsorber 36 of the subsequent stage in this way, and so adsorbent a is shifted and an adsorption process and desorption process are successively received with no need to switch an adsorber operating state between an adsorption process and desorption process, and a cooling effect in the evaporator 3 can be obtained completely continuously. Accordingly, according to this embodiment, in correspondence with a common fundamental characteristic of the several embodiments of the present invention, the adsorber 36 of the subsequent stage is provided so as to serve as backup via the additional heat exchanger 9 in order to heighten a cooling effect of the evaporator 3 by cooling adsorbent a in the adsorber 35 of the previous stage and heightening adsorption capacity, and so a high cooling effect is obtained by a comparatively small quantity of adsorbent a, and compactness of the overall system becomes possible thereby. Furthermore, it is also possible to substitute an ordinary adsorber which does not accompany circulation of adsorbent, as was seen in the above-described embodiments, for either of the adsorber 35 of the previous stage or the adsorber 36 of the subsequent stage.

Figure 26:
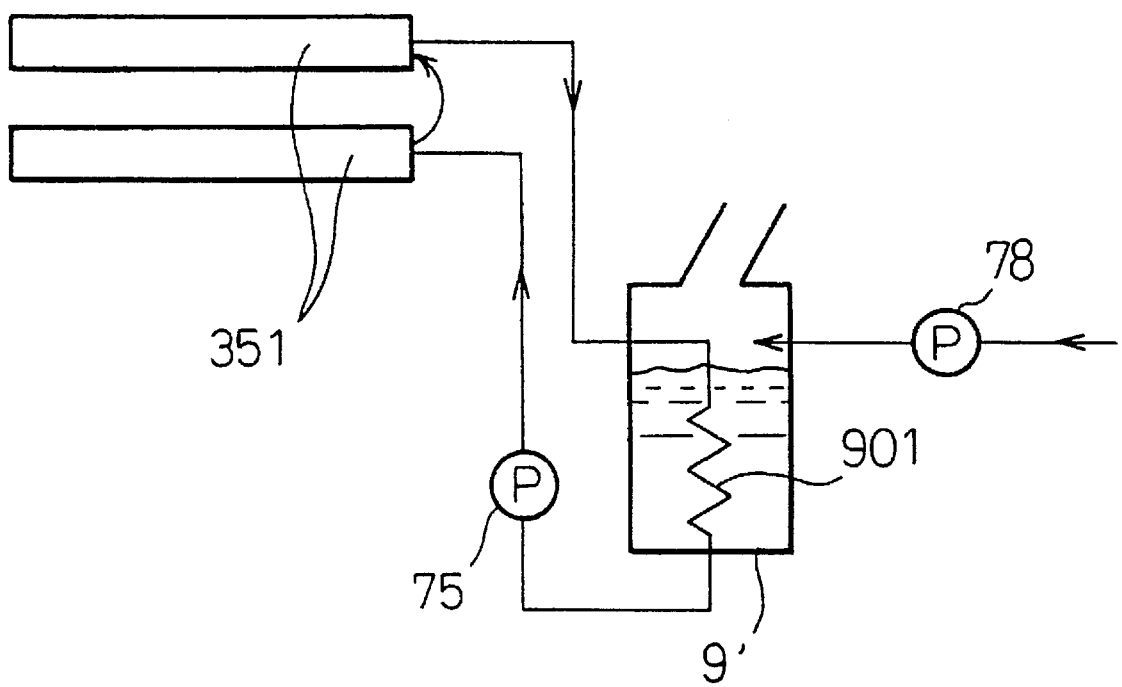
FIG. 26 is a partial structural diagram indicating an example of a partial modification of the structure of the twentieth embodiment.
Figure 28:
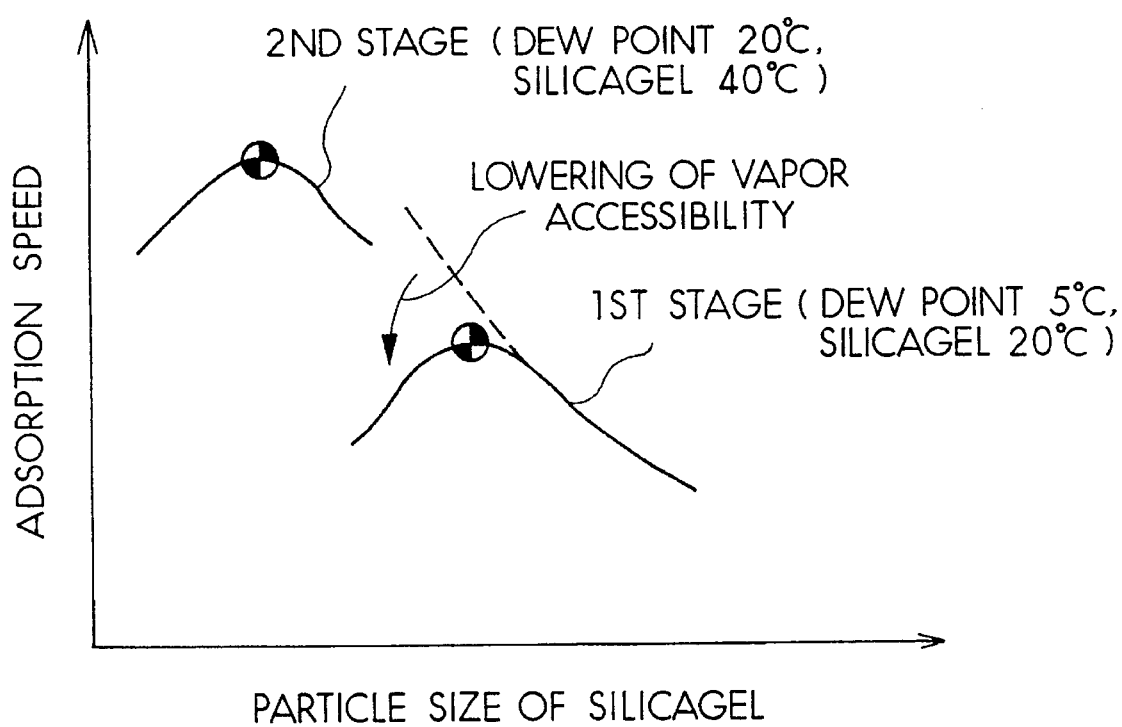
FIG. 28 is a curve diagram indicating change in optimal values for particle size of adsorbent to describe a modification of the twenty-first embodiment.

Moreover, according to the embodiment indicated in FIG. 25, the cooling pipes 351 and 361 and heating pipes 352 and 362 respectively utilize two heat exchangers, but it is also acceptable to use respectively one, or not less than three. Additionally, it is also acceptable to use an additional heat exchanger 9' such as is indicated in FIG. 26 as an additional heat exchanger, provide a heat-transfer pipe 901 in an interior thereof, and cause water of a system differing from refrigerant which cools the adsorber 36 of the subsequent stage to be circulated within the cooling pipe 351 of the adsorber 35 of the previous stage by a pump 75.

Next, in an adsorptive type refrigeration apparatus of a somewhat different standpoint and having adsorbers of a plurality of stages which, irrespective of presence of absence of a characteristic of settings structure, differs from an apparatus modifying a structure of an overall system as described above to achieve an object of the present invention, description will be made of an embodiment which can achieve an object of the present invention similarly to the several embodiments having a characteristic in system structure as was described above, by causing specifications of adsorbent loaded within the adsorbers of a plurality of stages thereof, i.e., a mode of loading and loading method or loaded amount of adsorbent to differ in each respective stage.

As is clear in the foregoing descriptions, in for example a two-stage adsorption system, comparison of a first-stage adsorber and a second-stage adsorber shows that temperature of adsorbent loaded in these respective adsorbers and dew-point temperature of water vapor adsorbed by the adsorbent of these mutually differ. In specific terms, as was indicated previously regarding one example of a case employing silica gel as adsorbent in an operation-characteristic curve diagram as FIG. 3, whereas operation point B of the first-stage adsorber 21 has a dew-point temperature of 5° C. and silica-gel temperature is 20° C., operation point B' of the second-stage adsorber 12 has a dew-point temperature of 20° C. and silica-gel temperature is 40° C. Consequently, when specifications of loading of the silica gel which is the adsorbent are established optimally for each respective adsorber in accordance with operating conditions of the respective adsorbers 11 and 12, so that respective adsorption speed of water vapor becomes as large as possible, it becomes possible to reduce the weight of silica gel which is used and cause the overall system to be compact.

A twenty-first embodiment will be described hereinafter with reference to FIGS. 27A, 27B, 27C and 28. A heat exchanger 15 indicated in FIG. 27A is composed of respectively hollow upper and lower headers 151 and 152, and a multiplicity of flat heat-exchange tubes 153 of lattice configuration to connect these. The respective headers 151 and 152 are provided with connection pipes 154 and 155. Silica gel (for example) is loaded, in accordance with specifications which will be described below, as adsorbent in spaces between the respective heat-exchange tubes 153 arranged in a lattice configuration. This heat exchanger 15 can be for example the cooling pipes 111 and 121 or heating pipes 122 and 122 in the adsorbers 11 and 12 indicated in FIG. 1. In a case where the heat exchanger 15 is utilized in a plurality of adsorbers of identical structure, characteristics exist in differences themselves regarding specifications of loading of adsorbent given among this plurality of adsorbers, and so no need exists for the structure of each heat exchanger 15 to provide novelty.

In a case where silica gel 157 which is adsorbent is loaded within a space 156 partitioned by thermal-transmission faces of metal fabrication such as the heat-exchange tubes 153 and the upper and lower headers 151 and 152, a method of loading the silica gel 157 may be either a method to secure one layer or a multiplicity of layers of the silica gel 157 by disposing some mounting device on a surface of the thermal-transmission face, as shown in FIG. 27B, or such that the silica gel 157 assumes a predetermined loading ( or filling) density within the space 156 formed by the thermal-transmission faces, as shown in FIG. 27C.

Consideration of efficiency of heat exchange on the thermal-transmission faces and accessability of water vapor, i.e., the extent of depth of a layer of the silica gel 157 loaded within the space 156 which can be reached by water vapor which is a gas refrigerant, indicates that the former method is advantageous; the former method is employed as well in an adsorptive type heat pump disclosed in Japanese Patent Application Laid-open No. 5-322364. However, because the usage rate of the space 156 is low with the former method, large size of the overall adsorber is unavoidable in a case of identical adsorption capacity. Consequently, the latter method which thoroughly fills the entirety of the space 156 with the silica gel 157 is much more advantageous in a case where compactness of the adsorber is pursued.

In this regard, it is a characteristic of the twenty-first embodiment of the present invention that, in an adsorptive type refrigeration apparatus having a two-stage adsorption system as shown in FIG. 1, loading (or filling) density of silica gel of the second-stage adsorber 12 is caused to be relatively high with respect to loading (or filling) density of silica gel of the first-stage adsorber 11. The way of thinking which is the basis of this embodiment, namely, that loading density of adsorbent becomes higher the later is the stage, can be applied even in a system of three or more stages. As was described above, when loading density of adsorbent is heightened in an attempt to increase the usage rate of the space 156 between the thermal-transmission faces, the accessability of water vapor to adsorbent generally declines, but because water vapor pressure becomes high in an adsorber of a subsequent stage and this acts to heighten the accessability of water vapor, there is no major reduction of the accessability of water vapor even when loading density of adsorbent in an adsorber of a subsequent stage is raised by a method according to the twenty-first embodiment. Compactness of the overall system can be achieved by raising loading density of adsorbent in this way.

Furthermore, it need hardly be said that an adsorptive type refrigeration apparatus disclosed in Japanese Patent Application Laid-open No. 3-152363 as the prior art has a face which somewhat resembles the twenty-first embodiment of the present invention in a sense of changing specifications of adsorbent, but whereas this prior art is an apparatus which gives consideration to temperature distribution within adsorption of one stage, the twenty-first embodiment of the present invention is an apparatus which is establishes a plurality of operating points such as operating points B and B' indicated in FIG. 3, and so the two are intrinsically different inventions.

According to the twenty-first embodiment, the system is caused to be compact by raising the loading density of adsorbent the later is the stage, but an object of the present invention can be similarly achieved even by a method whereby particle size of adsorbent such as silica gel is made smaller the later is the stage as a modification thereof. Because generally specific surface area of adsorbent becomes larger the smaller is the particle size thereof, adsorption speed of water vapor increases. Conversely, however, accessability of water vapor becomes poorer because ease of water vapor passage declines the smaller is the particle size of adsorbent. In this case, an optimal value for particle size exists in correspondence with conditions of silica gel during moisture adsorption. This is indicated by the curve diagram of FIG. 28. Because the optimal values of particle size (i.e., optimal values of adsorption speed) which have been marked tend to shift toward smaller particle size due to water vapor pressure becoming higher the later is the stage, the property thereof can be utilized to attempt compactness of the overall system.

According to the present invention, it becomes possible to make an adsorber compact in comparison with the prior art, and overall system compactness of an adsorptive type refrigeration apparatus can be achieved thereby. Additionally, according to the present invention, it becomes possible to obtain sufficiently large refrigeration capacity by a compact adsorptive type refrigeration apparatus provided with a compact adsorber containing a comparatively small quantity of adsorbent.

What is claimed is:

1. An adsorptive type refrigeration apparatus comprising:
   a plurality of adsorbers containing adsorbent for adsorbing refrigerant and including heating means for heating said adsorbent and cooling means for cooling said adsorbent;
   at least one evaporator for cooling air passing therethrough;
   at least one condenser for condensing the refrigerant by the air passing therethrough;
   switching means for switching passages connecting between said plurality of adsorbers, said evaporator and said condenser, wherein in an adsorption process, at least an (n)th adsorber and an (n+1)th adsorber among said plurality of adsorbers are thermally connected in series, said adsorbent contained within said (n)th adsorber which is a previous stage is cooled by adsorption of refrigerant by adsorbent contained within said (n+1)th adsorber which is a subsequent stage, wherein refrigerants of at least two systems circulating within mutually independent passages are related thermally.

2. An adsorptive type refrigeration apparatus according to claim 1, wherein a passage of refrigerant including said evaporator and a passage of refrigerant including at least one of said adsorbers connected to a subsequent stage thereof are mutually independent even while being related thermally, and refrigerants in said passages are avoided to be confluent together.

3. An adsorptive type refrigeration apparatus according to claim 1, wherein a passage downstream of at least one of said switching means for switching a passage branches into a plurality of passages to reduce a number of said switching means.

4. An adsorptive type refrigeration apparatus according to claim 1, wherein refrigerants from a plurality of said adsorbers are confluent and flow into at least one of said condensers so that a number of said condensers is reduced.

5. An adsorptive type refrigeration apparatus according to claim 1, wherein refrigerant from at least one said adsorber in an adsorption process and refrigerant from at least one said adsorber in a desorption process are confluent and flow into at least one of said condensers to reduce a number of said condensers.

6. An adsorptive type refrigeration apparatus according to claim 1, wherein a passage of refrigerant is switched to said adsorber of a subsequent stage by said switching means for switching a passage before adsorbent contained in said adsorber of a previous stage is saturated and loses adsorptive capacity.

7. An adsorptive type refrigeration apparatus according to claim 1, further comprising an adsorber group composed of a plurality of said adsorbers which assume an adsorption process simultaneously, and an adsorber group composed of a plurality of said adsorbers which assume a desorption process simultaneously, wherein each of said adsorber groups are controlled by said switching means for switching a passage so that each of said adsorber groups alternatingly repeats an adsorption process and desorption process.

8. An adsorptive type refrigeration apparatus according to claim 1, wherein refrigerant desorbed from said adsorbers disposed in a plurality of stages is processed by respectively different condensers.

9. An adsorptive type refrigeration apparatus according to claim 1, wherein said switching means for switching a passage is structured so that at least one of said plurality of adsorbers assumes a desorption process and simultaneously all other said adsorbers assume an adsorption process.

10. An adsorptive type refrigeration apparatus according to claim 1, wherein said heating means for heating and cooling means for cooling for adsorbent in at least one adsorber among said plurality of adsorbers are composed of a common heating-cooling pipe.

11. An adsorptive type refrigeration apparatus according to claim 10, wherein an additional heat exchanger is inserted thermally in series between an (n)th adsorber and an (n+1)th adsorber among a plurality of adsorbers connected thermally in series in an adsorption process.

12. An adsorptive type refrigeration apparatus according to claim 1, wherein adsorbent in at least one adsorber among a plurality of adsorbers circulates sequentially between said heating means and cooling means.

13. An adsorptive type refrigeration apparatus according to claim 12, wherein both an (n)th adsorber and an (n+1)th adsorber among a plurality of adsorbers are structured so that adsorbent is circulated sequentially in interiors thereof between said heating means and cooling means.

14. An adsorptive type refrigeration apparatus according to claim 13, wherein between a cooling region where an adsorption process is performed in an (n)th adsorber among a plurality of adsorbers and a cooling region where an adsorption process is similarly performed in an (n+1)th adsorber together with being connected thermally in series with respect to this, an additional heat exchanger is inserted in series with these two cooling regions.

15. An adsorptive type refrigeration apparatus according to claim 1, wherein a loading density of adsorbent in an (n+1)th adsorber of a subsequent stage thereof is higher than a loading density of adsorbent in an (n)th adsorber among a plurality of adsorbers connected thermally in series in an adsorption process.

16. An adsorptive type refrigeration apparatus according to claim 1, wherein a particle size of adsorbent in an (n+1)th adsorber of a subsequent stage thereof is higher than a particle size of adsorbent in an (n)th adsorber among a plurality of adsorbers connected thermally in series in an adsorption process.

17. An adsorptive type refrigeration apparatus according to claim 1, wherein said adsorbent is silica gel.

18. An adsorptive type refrigeration apparatus comprising:
   a plurality of adsorbers containing adsorbent for adsorbing refrigerant and including heating means for heating said adsorbent and cooling means for cooling said adsorbent;
   at least an evaporator for cooling the air passing therethrough;
   at least a condenser for condensing the air passing therethrough;
   switching means for switching passages connecting between said plurality of adsorber, said evaporator and said condenser, wherein at least one of said adsorbers is set as a first-stage adsorber and disposed downstream of said evaporator in such a manner to adsorb vapor from said evaporator, said adsorbent adsorbs said vapor and generates heat, said heat evaporates said refrigerant in said cooling means, at least one of said adsorbers is set as a second-stage adsorber and disposed downstream of said first-stage adsorber in such a manner to adsorb said vapor transferred from said adsorber through a passage, adsorbent in said second-stage adsorber adsorb said vapor and generates heat, said heat is adsorbed by said cooling means in said second-stage adsorber, said condenser is disposed downstream of said second-stage adsorber and cools said vapor of said refrigerant passing through said second-stage adsorber.

* * * * *